(12) United States Patent
Qian et al.

(10) Patent No.: US 12,494,780 B2
(45) Date of Patent: Dec. 9, 2025

(54) INTERFACE CIRCUIT, CONTROL METHOD THEREOF, CHIP, AND TERMINAL DEVICE

(71) Applicant: Huawei Technologies Co., Ltd., Shenzhen (CN)

(72) Inventors: Zhaohua Qian, Shanghai (CN); Jingjing Wang, Shenzhen (CN); Yanqin Chen, Shanghai (CN); Jiandong Ke, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 18/468,475

(22) Filed: Sep. 15, 2023

(65) Prior Publication Data

US 2024/0007106 A1 Jan. 4, 2024

Related U.S. Application Data

(63) Continuation of application No. PCT/CN2021/081342, filed on Mar. 17, 2021.

(51) Int. Cl.
*H03K 17/687* (2006.01)
*G06F 3/14* (2006.01)

(52) U.S. Cl.
CPC .......... *H03K 17/6872* (2013.01); *G06F 3/14* (2013.01)

(58) Field of Classification Search
CPC .......... H03K 17/6872; H03K 19/0027; H03K 19/00315; H03K 19/018521; H03K 17/687; H03K 2017/6878; H03K 17/735; H03K 17/76; H03K 19/0021; H03K 2217/0018; G06F 3/14; G05F 3/205; G11C 5/146; H02M 3/078

See application file for complete search history.

(56) References Cited

U.S. PATENT DOCUMENTS

| 5,963,055 A | 10/1999 | Tanaka et al. |
| 2015/0061746 A1 | 3/2015 | Liu et al. |
| 2023/0122458 A1* | 4/2023 | Zhang ............ G05F 3/262 |
| | | 323/280 |

FOREIGN PATENT DOCUMENTS

| CN | 106656148 A | 5/2017 |
| CN | 110798202 A | 2/2020 |
| GB | 2258100 A | 1/1993 |

* cited by examiner

*Primary Examiner* — Jung Kim
(74) *Attorney, Agent, or Firm* — Slater Matsil, LLP

(57) ABSTRACT

An interface circuit, a method for controlling the interface circuit, a chip, and a terminal device are provided. The interface circuit includes a first PMOS transistor, an input signal control circuit, a bias circuit, a signal input end, and an input/output end. The bias circuit includes a substrate bias voltage generation end and a bias voltage generation end. The bias circuit is coupled to a high-level power supply end, the input/output end, and a ground end. The input signal control circuit is connected to the signal input end, the bias voltage generation end, and a gate of the first PMOS transistor; a first electrode of the first PMOS transistor is connected to the high-level power supply end, and a second electrode of the first PMOS transistor is connected to the input/output end.

19 Claims, 5 Drawing Sheets

INTERFACE CIRCUIT, CONTROL METHOD THEREOF, CHIP, AND TERMINAL DEVICE

CROSS-REFERENCE TO RELATED APPLICATIONS

This application is a continuation of International Application No. PCT/CN2021/081342, filed on Mar. 17, 2021, the disclosure of which is hereby incorporated by reference in its entirety.

TECHNICAL FIELD

This application relates to the field of interface circuits, and in particular, to an interface circuit, a method for controlling the interface circuit, a chip, and a terminal device.

BACKGROUND

A host device and a self-powered device are usually connected through an interface. However, there is usually a scenario in which one of the host device and the self-powered device is powered off and the other is normally powered on. In this case, the device that is not powered off (that is, normally powered on) may flow back, through the interface, a current to the device that is powered off. Consequently, the following problems occur: an increase in device power consumption, a failure to normally power off the device, and the like.

For example, for a television (TV) and an external device that is a set-top box (STB) and connected to the television through a high-definition multimedia interface (HDMI), when only the set-top box is powered off and the television is normally powered on, the television usually flows back a current to a chip inside the set-top box through a cable and an HDMI, causing the following problems including an increase in power consumption, a failure to normally power off the set-top box, and the like.

SUMMARY

Embodiments of this application provide an interface circuit, a method for controlling the interface circuit, a chip, and a terminal device, to avoid a problem of current backflow.

This application provides an interface circuit, including a first positive-channel metal oxide semiconductor (PMOS) transistor (first PMOS transistor for short), an input signal control circuit, a bias circuit, a signal input end, and an input/output end. The input signal control circuit includes a first input end, a second input end, and an output end. The bias circuit includes a first end, a second end, a third end, a substrate bias voltage generation end, and a bias voltage generation end. The first input end of the input signal control circuit is connected to the signal input end, the second input end of the input signal control circuit is connected to the bias voltage generation end, and the output end of the input signal control circuit is connected to a gate of the first PMOS transistor. A first electrode of the first PMOS transistor is connected to a high-level power supply end, and a second electrode of the first PMOS transistor is connected to the input/output end. The substrate bias voltage generation end is connected to a substrate of the first PMOS transistor, the first end of the bias circuit is coupled to the high-level power supply end, the second end of the bias circuit is coupled to the input/output end, and the third end of the bias circuit is coupled to a ground end. The input signal control circuit is configured to transmit an electrical signal of the signal input end or an electrical signal of the bias voltage generation end to the gate of the first PMOS transistor. The bias circuit is configured to perform connection and conduction between the high-level power supply end and the substrate bias voltage generation end, or perform connection and conduction between the input/output end and the substrate bias voltage generation end.

For the interface circuit provided in embodiments of this application, the input signal control circuit and the bias circuit are disposed, and the bias circuit is controlled to perform connection and conduction between the high-level power supply end or the input/output end and the substrate bias voltage generation end, so that the first PMOS transistor can be in a reverse bias state. In addition, the input signal control circuit is controlled to transmit an electrical signal of the signal input end or the bias voltage generation end to the gate of the first PMOS transistor, so that the first PMOS transistor can be controlled to be conducted or cut off to ensure normal working of the interface circuit, or a voltage of the input/output end is prevented from flowing back through the first PMOS transistor and the substrate of the first PMOS transistor to the high-level power supply end.

In some possible implementations, when the high-level power supply end is powered on, the input signal control circuit is configured to transmit an electrical signal of the signal input end to the gate of the first PMOS transistor, and the bias circuit is configured to transmit a voltage of the high-level power supply end to the substrate bias voltage generation end. In this case, the voltage of the high-level power supply end is output to the substrate of the first PMOS transistor, to control the first PMOS transistor to be in a reverse bias state; and a voltage of the signal input end is input to the gate of the first PMOS transistor, to perform control to implement connection and conduction between the input/output end and the substrate bias voltage generation end, so as to conduct or cut off the first PMOS transistor, thereby ensuring a normal working state of the interface circuit. When the high-level power supply end is powered off and the input/output end is externally connected to a high-level signal, the input signal control circuit is configured to transmit an electrical signal of the bias voltage generation end to the gate of the first PMOS transistor, and the bias circuit is configured to transmit a voltage of the input/output end to the substrate bias voltage generation end. In this case, the voltage of the input/output end is output to the substrate of the first PMOS transistor, so that the first PMOS transistor is controlled to be in a reverse bias state; and an electrical signal of the bias voltage generation end is transmitted to the gate of the first PMOS transistor, so as to control the first PMOS transistor to be cut off, thereby preventing the voltage of the input/output end from flowing back through the first PMOS transistor and the substrate of the first PMOS transistor to the high-level power supply end.

In some possible implementations, the interface circuit is integrated into a chip, and the input/output end is connected to a pin of the chip.

In some possible implementations, the interface circuit provided in embodiments of this application further includes a first resistor. The first resistor is connected in series between the second electrode of the first PMOS transistor and the input/output end. The first resistor may be any type provided by using a process. In this case, a relatively accurate termination impedance value can be implemented by disposing the first resistor, thereby avoiding a disadvantage that it is difficult to implement a constant impedance value because an on-resistance value of an MOS transistor varies greatly with a process angle, a temperature, and a voltage.

In some possible implementations, the interface circuit provided in embodiments of this application further includes an input buffer circuit. An input end of the input buffer circuit is connected to the signal input end, an output end of the input buffer circuit is connected to the first input end of the input signal control circuit, and the input buffer circuit is connected to the high-level power supply end and a low-level power supply end. The input buffer circuit is configured to adjust a voltage amplitude of the signal input end to a voltage amplitude between the high-level power supply end and the low-level power supply end, and then output the adjusted voltage amplitude to the first input end of the input signal control circuit. In this case, in the interface circuit, the input buffer circuit is disposed to ensure that, after passing through the input signal control circuit, a voltage amplitude of the input signal control circuit can meet the control of conduction or cutoff of the first PMOS transistor.

In some possible implementations, the input signal control circuit may include a first negative-channel metal oxide semiconductor (NMOS) transistor (first NMOS transistor for short), a second PMOS transistor, and a third PMOS transistor. A gate of the first NMOS transistor is connected to the high-level power supply end, a first electrode of the first NMOS transistor is connected to the output end of the input signal control circuit, and a second electrode of the first NMOS transistor is connected to the first input end of the input signal control circuit. A gate of the second PMOS transistor is connected to the bias voltage generation end, a first electrode of the second PMOS transistor is connected to an input end of the input signal control circuit, and a second electrode of the second PMOS transistor is connected to the output end of the input signal control circuit. A gate of the third PMOS transistor is connected to the high-level power supply end, a first electrode of the third PMOS transistor is connected to the second input end of the input signal control circuit, and a second electrode of the third PMOS transistor is connected to the output end of the input signal control circuit.

In some possible implementations, the bias circuit may include a second resistor, a third resistor, a fourth PMOS transistor, a fifth PMOS transistor, a sixth PMOS transistor, and a second NMOS transistor. One end of the second resistor is connected to the high-level power supply end, and the other end of the second resistor is connected to a first node. One end of the third resistor is connected to the input/output end, and the other end of the third resistor is connected to a first electrode of the fifth PMOS transistor. A gate of the fourth PMOS transistor is connected to a second node, a first electrode of the fourth PMOS transistor is connected to the first node, and a second electrode of the fourth PMOS transistor is connected to the substrate bias voltage generation end. A gate of the fifth PMOS transistor is connected to the first node, and a second electrode of the fifth PMOS transistor is connected to the second node. A gate of the sixth PMOS transistor is connected to the first node, a first electrode of the sixth PMOS transistor is connected to the second node, and a second electrode of the sixth PMOS transistor is connected to the substrate bias voltage generation end. A gate of the second NMOS transistor is connected to the first node, a first electrode of the second NMOS transistor is connected to the ground end, and a second electrode of the second NMOS transistor is connected to the second node.

In some possible implementations, the interface circuit may further include a seventh PMOS transistor and an over-voltage protection control circuit. The over-voltage protection control circuit includes an over-voltage protection output end, and the over-voltage protection control circuit is connected to the high-level power supply end, the bias voltage generation end, and the input/output end. A gate of the seventh PMOS transistor is connected to the over-voltage protection output end, a first electrode of the seventh PMOS transistor is connected to the second electrode of the first PMOS transistor, a second electrode of the seventh PMOS transistor is connected to the input/output end, and a substrate of the seventh PMOS transistor is connected to the substrate bias voltage generation end. For the interface circuit, when the high-level power supply end is powered on, the over-voltage protection control circuit is configured to output a voltage of the bias voltage generation end to the gate of the seventh PMOS transistor, so as to control a conducted or cutoff state of the seventh PMOS transistor to be consistent with that of the first PMOS transistor; or when the high-level power supply end is powered off and the input/output end is externally connected to a high-level signal, the over-voltage protection control circuit is configured to output a voltage of the input/output end to the gate of the seventh PMOS transistor, so as to control the seventh PMOS transistor to be cut off.

In some possible implementations, the bias circuit may include a bias voltage generation sub-circuit and a substrate bias voltage generation sub-circuit. The bias voltage generation sub-circuit is connected to the bias voltage generation end, the high-level power supply end, the input/output end, and the ground end. The substrate bias voltage generation sub-circuit is connected to the substrate bias voltage generation end, the high-level power supply end, the input/output end, and the bias voltage generation end. For the interface circuit, when the high-level power supply end is powered on, the bias circuit is configured to: output, under the control of each connected end, an intermediate voltage between the high-level power supply end and the ground end to the bias voltage generation end by using the bias voltage generation sub-circuit; and output, under the control of each connected end, the voltage of the high-level power supply end to the substrate bias voltage generation end by using the substrate bias voltage generation sub-circuit; or when the high-level power supply end is powered off and the input/output end is externally connected to a high-level signal, the bias circuit is configured to: output, under the control of each connected end, an intermediate voltage between the input/output end and the ground end to the bias voltage generation end by using the bias voltage generation sub-circuit; and output, under the control of each connected end, the voltage of the input/output end to the substrate bias voltage generation end by using the substrate bias voltage generation sub-circuit.

In some possible implementations, the bias voltage generation sub-circuit may include a fourth resistor, a fifth resistor, a sixth resistor, a seventh resistor, an eighth PMOS transistor, a ninth PMOS transistor, a tenth PMOS transistor, and a third NMOS transistor. The fourth resistor and the fifth resistor are connected in series between the high-level power supply end and the ground end, and a connection node between the fourth resistor and the fifth resistor is connected to a third node. The sixth resistor and the seventh resistor are connected in series between the input/output end and the ground end, the connection node between the fourth resistor and the fifth resistor is connected to the third node, a connection node between the sixth resistor and the seventh resistor is connected to a first electrode of the eighth PMOS transistor, a gate of the eighth PMOS transistor is connected to the third node, and a second electrode of the eighth PMOS transistor is connected to a fourth node. A gate of the ninth PMOS transistor is connected to the fourth node, a first electrode of the ninth PMOS transistor is connected to the third node, and a second electrode of the ninth PMOS transistor is connected to the bias voltage generation end. A gate of the tenth PMOS transistor is connected to the third node, a first electrode of the tenth PMOS transistor is connected to the fourth node, and a second electrode of the tenth PMOS transistor is connected to the bias voltage generation end. A gate of the third NMOS transistor is connected to the third node, a first electrode of the third NMOS transistor is connected to the ground end, and a second electrode of the third NMOS transistor is connected to the fourth node.

In some possible implementations, the substrate bias voltage generation sub-circuit may include an eleventh PMOS transistor, a twelfth PMOS transistor, a thirteenth PMOS transistor, a fourteenth PMOS transistor, a fifteenth PMOS transistor, and a sixteenth PMOS transistor. A gate of the eleventh PMOS transistor is connected to the bias voltage generation end, a first electrode of the eleventh PMOS transistor is connected to the high-level power supply end, a second electrode of the eleventh PMOS transistor is connected to a first electrode of the twelfth PMOS transistor, a gate of the twelfth PMOS transistor is connected to the over-voltage protection output end, and a second electrode of the twelfth PMOS transistor is connected to the substrate bias voltage generation end. A gate of the thirteenth PMOS transistor is connected to the bias voltage generation end, a first electrode of the thirteenth PMOS transistor is connected to the input/output end, a second electrode of the thirteenth PMOS transistor is connected to a first electrode of the fourteenth PMOS transistor, and a second electrode of the fourteenth PMOS transistor is connected to the substrate bias voltage generation end. A gate of the fifteenth PMOS transistor is connected to the bias voltage generation end, a first electrode of the fifteenth PMOS transistor is connected to the high-level power supply end, and a second electrode of the fifteenth PMOS transistor is connected to a gate of the fourteenth PMOS transistor. A gate of the sixteenth PMOS transistor is connected to the high-level power supply end, a first electrode of the sixteenth PMOS transistor is connected to the bias voltage generation end, and a second electrode of the sixteenth PMOS transistor is connected to the gate of the fourteenth PMOS transistor.

In some possible implementations, the over-voltage protection control circuit may include a fourth NMOS transistor, a fifth NMOS transistor, a seventeenth PMOS transistor, an eighteenth PMOS transistor, a nineteenth PMOS transistor, and a twentieth PMOS transistor. A gate of the fourth NMOS transistor is connected to the high-level power supply end, a first electrode of the fourth NMOS transistor is connected to a second electrode of the fifth NMOS transistor, and a second electrode of the fourth NMOS transistor is connected to the bias voltage generation end. A first electrode of the fifth NMOS transistor is connected to the over-voltage protection output end, and a gate of the fifth NMOS transistor is connected to a fifth node. A gate of the seventeenth PMOS transistor is connected to the bias voltage generation end, a first electrode of the seventeenth PMOS transistor is connected to the high-level power supply end, and a second electrode of the seventeenth PMOS transistor is connected to the fifth node. A gate of the eighteenth PMOS transistor is connected to the high-level power supply end, a first electrode of the eighteenth PMOS transistor is connected to the bias voltage generation end, and a second electrode of the eighteenth PMOS transistor is connected to the fifth node. A gate of the nineteenth PMOS transistor is connected to the bias voltage generation end, a first electrode of the nineteenth PMOS transistor is connected to the input/output end, and a second electrode of the nineteenth PMOS transistor is connected to a first electrode of the twentieth PMOS transistor. A gate of the twentieth PMOS transistor is connected to the fifth node, and a second electrode of the twentieth PMOS transistor is connected to the over-voltage protection output end.

An embodiment of this application further provides a chip, including a pin and the interface circuit provided in any one of the foregoing possible implementations. The input/output end of the interface circuit is connected to the pin.

An embodiment of this application further provides a terminal device, including an interface and a chip, where the chip is connected to the interface and implemented according to any one of the foregoing possible implementations.

An embodiment of this application further provides a method for controlling the interface circuit according to any one of the foregoing possible implementations. The interface circuit includes a first PMOS transistor, an input signal control circuit, a bias circuit, a signal input end, and an input/output end. A first electrode of the first PMOS transistor is connected to a high-level power supply end, and a second electrode of the first PMOS transistor is connected to the input/output end. The signal input end is connected to a gate of the first PMOS transistor by using the input signal control circuit. The bias circuit includes a substrate bias voltage generation end and a bias voltage generation end. The substrate bias voltage generation end is connected to a substrate of the first PMOS transistor, and the bias voltage generation end is connected to the input signal control circuit. The method for controlling the interface circuit may include: controlling the input signal control circuit to output a voltage input by the signal input end or a voltage of the bias voltage generation end of the bias circuit to the gate of the first PMOS transistor; and controlling the bias circuit to input, by using the substrate bias voltage generation end, a voltage of the high-level power supply end or a voltage of the input/output end to the substrate of the first PMOS transistor.

According to the method for controlling the interface circuit provided in this embodiment of this application, the bias circuit is controlled to perform connection and conduction between the high-level power supply end or the input/output end and the substrate bias voltage generation end, so that the first PMOS transistor can be in a reverse bias state. In addition, the input signal control circuit is controlled to transmit an electrical signal of the signal input end or the bias voltage generation end to the gate of the first PMOS transistor, so that the first PMOS transistor can be controlled to be conducted or cut off to ensure normal working of the interface circuit, or a voltage of the input/output end is prevented from flowing back through the first PMOS transistor and the substrate of the first PMOS transistor to the high-level power supply end.

In some possible implementations, the method for controlling the interface circuit may include: in a state in which the high-level power supply end supplies power, controlling the input signal control circuit to output a signal input by the signal input end to the gate of the first PMOS transistor, and controlling the bias circuit to input, by using the substrate bias voltage generation end, a voltage of the high-level power supply end to the substrate of the first PMOS transistor, so that the first PMOS transistor is in a reversed bias state, so as to control the first PMOS transistor to be conducted or cut off, thereby ensuring a normal working state of the interface circuit; or in a state in which the high-level power supply end is powered off and the input/output end is externally connected to a high-level signal, controlling the input signal control circuit to output a voltage of the bias voltage generation end of the bias circuit to the gate of the first PMOS transistor, and controlling the bias circuit to input, by using the substrate bias voltage generation end, a voltage of the input/output end to the substrate of the first PMOS transistor, so that the first PMOS transistor is in a reverse bias state, so as to control the first PMOS transistor to be cut off, thereby preventing the voltage of the input/output end from flowing back through the first PMOS transistor and the substrate of the first PMOS transistor to the high-level power supply end.

In some possible implementations, the interface circuit further includes an input buffer circuit, the input buffer circuit is connected between the signal input end and the input signal control circuit, and the input buffer circuit is connected to the high-level power supply end and a low-level power supply end. In this case, the controlling the input signal control circuit to output a signal input by the signal input end to the gate of the first PMOS transistor includes: controlling the input buffer circuit to adjust a voltage input by the signal input end to a voltage amplitude between the high-level power supply end and the low-level power supply end; and then outputting the adjusted voltage to the gate of the first PMOS transistor by using the input signal control circuit.

In some possible implementations, the interface circuit further includes a seventh PMOS transistor and an over-voltage protection control circuit, where the over-voltage protection control circuit is connected to the bias voltage generation end and the input/output end; a gate of the seventh PMOS transistor is connected to the over-voltage protection control circuit, a first electrode of the seventh PMOS transistor is connected to the second electrode of the first PMOS transistor, and a second electrode of the seventh PMOS transistor is connected to the input/output end; and a substrate of the seventh PMOS transistor is connected to the substrate bias voltage generation end. In this case, the method for controlling the interface circuit further includes: in a state in which the high-level power supply end supplies power, controlling the over-voltage protection control circuit to output the voltage of the bias voltage generation end to the gate of the seventh PMOS transistor, and controlling the bias circuit to input, by using the substrate bias voltage generation end, the voltage of the high-level power supply end to the substrate of the seventh PMOS transistor, so as to control a conducted or cutoff state of the seventh PMOS transistor to be consistent with that of the first PMOS transistor; or in a state in which the high-level power supply end is powered off and the input/output end is externally connected to a high-level signal, controlling the over-voltage protection control circuit to output the voltage of the input/output end to the gate of the seventh PMOS transistor, and controlling the bias circuit to input, by using the substrate bias voltage generation end, the voltage of the input/output end to the substrate of the seventh PMOS transistor, so as to control the seventh PMOS transistor to be cut off.

In some possible implementations, the bias circuit includes a bias voltage generation sub-circuit and a substrate bias voltage generation sub-circuit, where the bias voltage generation sub-circuit is connected to the bias voltage generation end, the high-level power supply end, the input/output end, and a ground end; and the substrate bias voltage generation sub-circuit is connected to the substrate bias voltage generation end, the high-level power supply end, the input/output end, and the bias voltage generation end. In this case, the method for controlling the interface circuit further includes: in a state in which the high-level power supply end supplies power, controlling the bias voltage generation sub-circuit to output an intermediate voltage between the high-level power supply end and the ground end to the bias voltage generation end, and controlling the substrate bias voltage generation sub-circuit to output the voltage of the high-level power supply end to the substrate bias voltage generation end; or in a state in which the high-level power supply end is powered off and the input/output end is externally connected to a high-level signal, controlling the bias voltage generation sub-circuit to output an intermediate voltage between the input/output end and the ground end to the bias voltage generation end, and controlling the substrate bias voltage generation sub-circuit to output the voltage of the input/output end to the substrate bias voltage generation end.

DETAILED DESCRIPTION OF ILLUSTRATIVE EMBODIMENTS

Figure 1:
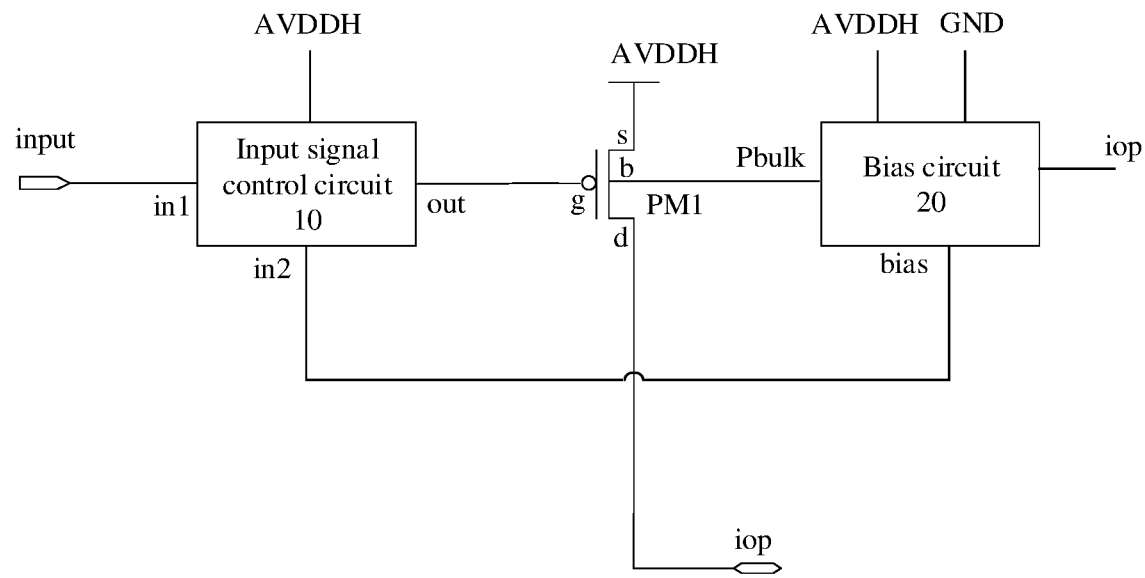
FIG. 1 is a schematic diagram of a structure of an interface circuit according to an embodiment of this application.

To make the objectives, technical solutions, and advantages of this application clearer, the following clearly describes the technical solutions in this application with reference to the accompanying drawings in this application. It is clear that the described embodiments are merely a part rather than all embodiments of this application. All other embodiments obtained by a person of ordinary skill in the art based on embodiments of this application without creative efforts shall fall within the protection scope of this application.

In the specification, embodiments, claims, and accompanying drawings of this application, the terms such as "first" and "second" are merely intended for distinguishing between descriptions, and cannot be understood as an indication or implication of relative importance, or understood as an indication or implication of an order; "connection", "connect", and similar terms are used for indicating interworking or interaction between different components, and may include a coupling connection, a direct connection, or an indirect connection performed by using another component; and the terms "include", "have", and any variant thereof are intended to cover non-exclusive inclusion, for example, include a series of steps or units. Methods, systems, products, or devices are not necessarily limited to those steps or units that are clearly listed, but may include other steps or units that are not clearly listed or that are inherent to such processes, methods, products, or devices.

It needs to be understood that in this application, "at least one" means one or more and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including any combination of singular items (pieces) or plural items (pieces). For example, at least one of a, b, or c may indicate a, b, c, "a and b", "a and c", "b and c", or "a and b and c", where a, b, and c may be singular or plural.

An embodiment of this application provides a terminal device. The terminal device may be an electronic product such as a mobile phone, a television, a tablet computer, a notebook computer, an on-board computer, a smartwatch, a smart band, or the like. A specific form of the terminal device is not specially limited in this embodiment of this application.

An interface and a chip connected to the interface are disposed in the terminal device provided in this embodiment of this application. For example, the chip and the interface may be connected by using a printed circuit board (PCB), wiring, or the like. This is not limited in this application.

For a chip, the chip may generally include multiple pins (pin), and an interface circuit (which may also be referred to as a termination circuit) is integrated into the chip. The interface circuit is connected to the pins, so as to perform signal transmission (including input and output) of the chip through the interface circuit. A port that is in the interface circuit and that is connected to a pin of the chip may be generally referred to as an input/output end (input/output) (which is represented as iop in the following descriptions and in the accompanying drawings).

It may be understood that in the chip, interface circuits may be separately disposed for some pins, or interface circuits may be separately disposed for all pins. This is not limited in this application, and may be disposed according to a requirement in practice. In addition, a disposition form of the interface is not specifically limited in this application. For example, the interface may be a high-definition multimedia interface (HDMI), a universal serial bus (USB) interface, or the like.

For the terminal device, an interface circuit inside the chip is connected to a chip pin by using an input/output end, and the chip pin is connected to an interface (for example, an HDMI interface or a USB interface) of the terminal device by using a PCB, a cable, or the like, so that the terminal device can normally interact with an external device through the interface. For example, the terminal device is a television, and the external device is a set-top box, a Wireless Fidelity (wireless fidelity, Wi-Fi) module, or the like, where the set-top box is connected to a chip (or an interface circuit in the chip) in the television through an HDMI of the television, and the Wi-Fi module is connected to the chip in the television through a USB interface.

In the terminal device provided in this embodiment of this application, an interface circuit connected to a chip pin is disposed inside the chip. The interface circuit can prevent a phenomenon of current backflow upon power-off of the terminal device. In other words, when the terminal device is connected to another external device through the interface, even if the chip pin can receive an electrical signal from the external device upon power-off of the terminal device, the interface circuit disposed inside the chip can prevent a current from flowing back through the chip pin (pin).

The following specifically describes disposition of the interface circuit provided in embodiments of this application.

Refer to FIG. 1. An embodiment of this application provides an interface circuit. The interface circuit includes a first PMOS transistor PM1, an input signal control circuit 10, a bias circuit 20, a signal input end input, and an input/output end iop. The input signal control circuit 10 includes a first input end in1, a second input end in2, and an output end out.

First, it needs to be noted that a PMOS transistor (that is, a P-channel metal oxide semiconductor transistor) in embodiments of this application may alternatively be a P-channel metal oxide semiconductor field effect transistor (metal oxide semiconductor field effect transistor) or a P-channel enhanced (enhanced) metal oxide semiconductor field effect transistor. Similarly, an NMOS transistor (that is, an N-channel metal oxide semiconductor transistor) may be an N-channel metal oxide semiconductor field effect transistor or an N-channel enhanced metal oxide semiconductor field effect transistor.

In another alternative implementation, in some embodiments, an MOS transistor in the interface circuit in this application may alternatively be a bipolar junction transistor (BJT), provided that function requirements of the circuit can be met. In the following embodiments of this application, the interface circuit is described by using MOS transistors as an example.

In addition, it may be understood that: first, each MOS transistor (which may be a PMOS transistor or an NMOS transistor) in this application may be a single MOS transistor, or may be formed by a plurality of MOS transistors connected in series and/or in parallel, which is not limited in this application, and a design may be performed based on a requirement for each transistor during actual manufacturing; second, one of the two electrodes (a first electrode and a second electrode), other than a gate, in an MOS transistor is a source, the other electrode is a drain, and the two electrodes are not literally distinguished. For example, if the first electrode is the source, the second electrode is the drain; or if the first electrode is the drain, the second electrode is the source. In the following embodiments, this application is described by using the first electrode as the source and the second electrode as the drain. In addition, to ensure that the accompanying drawings are clear, merely a source s, drain d, and gate g of a part of MOS transistors (for example, PM1) are marked in the accompanying drawings. For a source, drain, and gate of another MOS transistor, reference may be made correspondingly, and they are not repeatedly marked in the accompanying drawings.

Refer to FIG. 1. In the interface circuit, a source s of the first PMOS transistor PM1 is connected to a high-level power supply end AVDDH, a drain d of the first PMOS transistor PM1 is connected to the input/output end iop, and the input/output end iop is connected to a chip pin (pin) by using a connection structure such as a pad or a bump.

Refer to FIG. 1. The first input end in1 of the input signal control circuit 10 is connected to the signal input end input, the second input end in2 of the input signal control circuit 10 is connected to a bias voltage generation end bias of the bias circuit 20, and the output end out of the input signal control circuit 10 is connected to a gate g of the first PMOS transistor PM1. The input signal control circuit 10 is configured to transmit an electrical signal of the signal input end input to the gate of the first PMOS transistor PM1, or transmit an electrical signal of the bias voltage generation end bias to the gate of the first PMOS transistor PM1.

Refer to FIG. 1. The bias circuit 20 includes: a substrate bias voltage generation end Pbulk, the bias voltage generation end bias, a first end coupled to the high-level power supply end AVDDH, a second end coupled to the input/output end iop, and a third end coupled to a ground end GND. The substrate bias voltage generation end Pbulk is connected to a substrate b of the first PMOS transistor PM1. The bias circuit 20 is configured to perform connection and conduction between the high-level power supply end AVDDH and the substrate bias voltage generation end Pbulk, or perform connection and conduction between the input/output end iop and the substrate bias voltage generation end Pbulk, so as to control a parasitic diode, which is formed between the source s, the drain d, and the substrate b of the first PMOS transistor PM1, to be in a reverse bias state (that is, a reverse bias state), which may also be referred to as that the first PMOS transistor PM1 is in a reverse bias state.

In conclusion, according to the interface circuit provided in this embodiment of this application, the input signal control circuit 10 and the bias circuit 20 are disposed, and the bias circuit 20 is controlled to perform connection and conduction between the high-level power supply end AVDDH or the input/output end iop and the substrate bias voltage generation end Pbulk, so that the first PMOS transistor PM1 can be in a reverse bias state. In addition, the input signal control circuit 10 is controlled to transmit an electrical signal of the signal input end input or the bias voltage generation end bias to the gate of the first PMOS transistor PM1, so that the first PMOS transistor PM1 can be controlled to be conducted or cut off to ensure normal working of the interface circuit, or a voltage of the input/output end iop is prevented from flowing back through the first PMOS transistor PM1 and the substrate of the first PMOS transistor PM1 to the high-level power supply end AVDDH.

With reference to actual working of the terminal device, the following specifically describes control processes of the interface circuit provided in embodiments of this application in different states.

The interface circuit provided in embodiments of this application may fall into three states:
first, the high-level power supply end AVDDH is normally powered on, and the interface circuit is in a normal working state; or
second, the high-level power supply end AVDDH is powered off (or does not normally supply power), and the input/output end iop is not externally connected to a signal (that is, the input/output end iop is externally connected to a zero voltage or disconnected); in this case, the interface circuit is in a non-working state; or
third, the high-level power supply end AVDDH is powered off (that is, does not normally supply power), and a signal, to which the input/output end iop is externally connected, is at a high level (or pulled up by an external circuit). In this case, the interface circuit is in a current backflow prevention state.

When the interface circuit is in the non-working state (that is, the second state), the entire interface circuit is not enabled. Therefore, related descriptions thereof are not provided in the following embodiments of this application. The following embodiments of this application mainly describe a specific working process of each circuit in the interface circuit with reference to the normal working state and the current backflow prevention state of the interface circuit.

In some possible implementations, for the interface circuit provided in embodiments of this application,
when the high-level power supply end AVDDH is normally powered on, and the interface circuit is in the normal working state:
the bias circuit 20 performs control to implement connection and conduction between the high-level power supply end AVDDH and the substrate bias voltage generation end Pbulk, and transmits a voltage (used as a first substrate bias voltage $V_{a1}$) of the high-level power supply end AVDDH to the substrate b of the first PMOS transistor PM1 by using the substrate bias voltage generation end Pbulk, thereby ensuring that a parasitic diode formed between the source s, the drain d, and the substrate b of the first PMOS transistor PM1 is in a reverse bias state (that is, a reverse bias state). In addition, an electrical signal of the signal input end input is transmitted to the gate of the first PMOS transistor PM1 by using the input signal control circuit 10, so that conduction and cutoff of the first PMOS transistor PM1 can be directly implemented by using a voltage of the signal input end input, so as to determine whether to output the voltage of the high-level power supply end AVDDH to the input/output end iop, thereby ensuring normal working of the interface circuit.

In other words, when the interface circuit is in the normal working state, a voltage of the high-level power supply end AVDDH is output by using the bias circuit 20 to the substrate of the first PMOS transistor PM1, to control a parasitic diode formed between the source s, the drain d, and the substrate b of the first PMOS transistor PM1 to be in a reverse bias state, and a voltage of the signal input end input is input by using the input signal control circuit 10 to the gate of the first PMOS transistor PM1, to control the first PMOS transistor PM1 to be conducted or cut off, so as to ensure the normal working state of the interface circuit.

When the high-level power supply end AVDDH is powered off, the input/output end iop is externally connected to a high-level signal (that is, pulled up by an external circuit), and the interface circuit is in the current backflow prevention state:
the input signal control circuit 10 outputs an electrical signal (which may also be referred to as a second bias voltage $V_{b2}$) generated by the bias voltage generation end bias of the bias circuit 20 to the gate of the first PMOS transistor PM1, so as to control the first PMOS transistor PM1 to be cut off. In addition, the bias circuit 20 performs control to implement connection and conduction between the input/output end iop and the substrate bias voltage generation end Pbulk, and outputs a voltage (used as a second substrate bias voltage $V_{a2}$) of the input/output end iop to the substrate b of the first PMOS transistor PM1 by using the substrate bias voltage generation end Pbulk, so as to ensure that a parasitic diode formed between the source s, the drain d, and the substrate b of the first PMOS transistor PM1 is reversely biased to avoid current leakage, thereby avoiding a current backflow from a high level of the input/output end iop to the high-level power supply end AVDDH.

In other words, when the interface circuit is in the current backflow prevention state, a voltage of the input/output end iop is output to the substrate of the first PMOS transistor PM1 by using the bias circuit 20, to control a parasitic diode formed between the source s, the drain d, and the substrate b of the first PMOS transistor PM1 to be in a reverse bias state. In addition, a voltage generated by the bias voltage generation end bias is output to the gate of the first PMOS transistor PM1 by using the input signal control circuit 10, to control the first PMOS transistor PM1 to be cut off, thereby preventing the voltage of the input/output end iop from flowing back through the first PMOS transistor PM1 and the substrate of the first PMOS transistor PM1 to the high-level power supply end AVDDH.

It needs to be noted herein that, because factors such as a voltage drop and a loss inevitably exist in wiring and a related component, in a control process of the interface circuit, when two ports are connected (for example, when the bias circuit 20 performs control to implement connection and conduction between the high-level power supply end AVDDH and the substrate bias voltage generation end Pbulk), potentials of the two ports may be different to some extent, but may be considered as being equal or approximately equal to each other. Similarly, descriptions such as "approximate", "equal to", and "is" are used to represent a relationship between two voltages, and similar cases are not described again.

Figure 2:
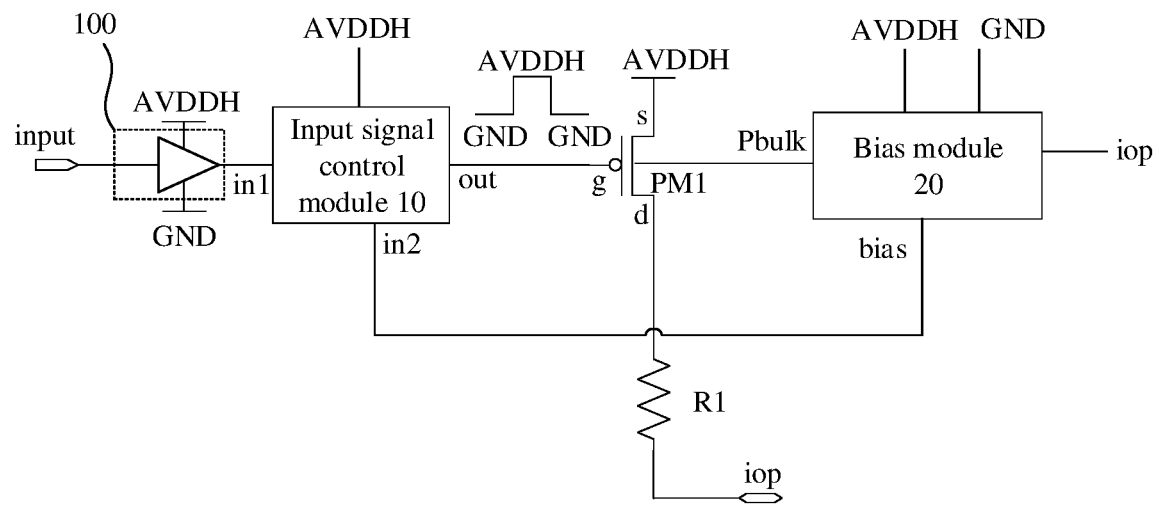
FIG. 2 is a schematic diagram of a structure of an interface circuit according to an embodiment of this application.

On this basis, as shown in FIG. 2, because an on-resistance value of an MOS transistor varies greatly with a process angle, a temperature, and a voltage, it is relatively difficult to implement a constant impedance value; and to implement a relatively accurate termination impedance value, in some possible implementations, a first resistor R1 may be disposed in series between the drain d of the first PMOS transistor PM1 and the input/output end iop in the interface circuit. A type of the resistor may be any type provided by a used process. The following embodiments are described by using an example in which the first resistor R1 is disposed in the interface circuit.

In some possible implementations, to ensure that, after passing through the input signal control circuit 10, a voltage amplitude of the input signal control circuit 10 can meet the control of the first PMOS transistor PM1 to get conducted or cut off, an input buffer circuit 100 may be disposed between the signal input end input and the input signal control circuit 10, as shown in FIG. 2.

For example, as shown in FIG. 2, an input end of the input buffer circuit 100 is connected to the signal input end input, an output end of the input buffer circuit 100 is connected to the first input end in1 of the input signal control circuit 10, and the input buffer circuit 10 is connected to the high-level power supply end AVDDH and a low-level power supply end (such as AVDDL or GND, which may be disposed as required; refer to the following related descriptions for details). The input buffer circuit 100 can adjust a voltage amplitude of the signal input end input to a voltage amplitude between the high-level power supply end AVDDH and the low-level power supply end (AVDDL/GND), and output the adjusted voltage amplitude to the first input end in1 of the input signal control circuit 10, so as to meet a control requirement for the first PMOS transistor PM1. In the following embodiments of this application, an example in which the input buffer circuit 100 is disposed in the interface circuit is used for description.

In this application, a disposition form of the input buffer circuit 100 is not limited, and the input buffer circuit 100 may be disposed according to an actual requirement. For example, in some possible implementations, the input buffer circuit 100 may be formed by two inverters connected in series. The inverters may be of a circuit structure including but not limited to a COMS (complementary metal oxide semiconductor, complementary metal oxide semiconductor) inverter and a NOT gate circuit.

In addition, a person skilled in the art may understand that, for PMOS transistors (for example, the first PMOS transistor), a transistor of a different process has a different maximum withstand voltage. For example, a transistor of a 1.8 V process supports a transistor with a withstand voltage of 1.8 V, or a transistor of a 2.5 V process supports a transistor with a withstand voltage of 2.5 V to 3.3 V. Generally, a transistor with a low withstand voltage or a transistor with a high withstand voltage may be defined depending on whether a withstand voltage process value of the transistor is greater than a relative power supply voltage. A transistor with a withstand voltage process value less than the power supply voltage is referred to as a transistor with a low withstand voltage; and a transistor with a withstand voltage process value greater than or equal to the power supply voltage is referred to as a transistor with a high withstand voltage. For example, for transistors of a 1.8 V process in a circuit using a 3.3 V power supply voltage, a transistor with a withstand voltage of 1.8 V is referred to as a transistor with a low withstand voltage, and a transistor with a withstand voltage of 3.3 V is referred to as a transistor with a high withstand voltage. For the interface circuit provided in embodiments of this application, a difference may exist to some extent, in an aspect such as a structure or a connection relationship of the interface circuit, between a case in which the PMOS transistor is a transistor with a low withstand voltage and a case in which the PMOS transistor is a transistor with a high withstand voltage. The following specifically describes, by using specific embodiments, the interface circuit in a case which transistors with a low withstand voltage are used and the interface circuit in a case which transistors with a high withstand voltage are used.

Embodiment 1

This embodiment describes specific disposition of the interface circuit in a case in which the PMOS transistors in the interface circuit are transistors with a high withstand voltage. For example, in Embodiment 1, a withstand voltage range of the transistors with the high withstand voltage is 3.3 V, the voltage of the high-level power supply end AVDDH is 3.3 V, the low-level power supply end is the ground end GND, and a voltage of the high-level signal to which the input/output end iop is externally connected is 3.3 V (but this application is not limited thereto). In addition, working states of the interface circuit are described for illustration with reference to the control of each MOS transistor in the interface circuit.

The following describes specific disposition of the input signal control circuit 10 and that of the bias circuit 20 in the interface circuit in Embodiment 1 for illustration.

Figure 3:
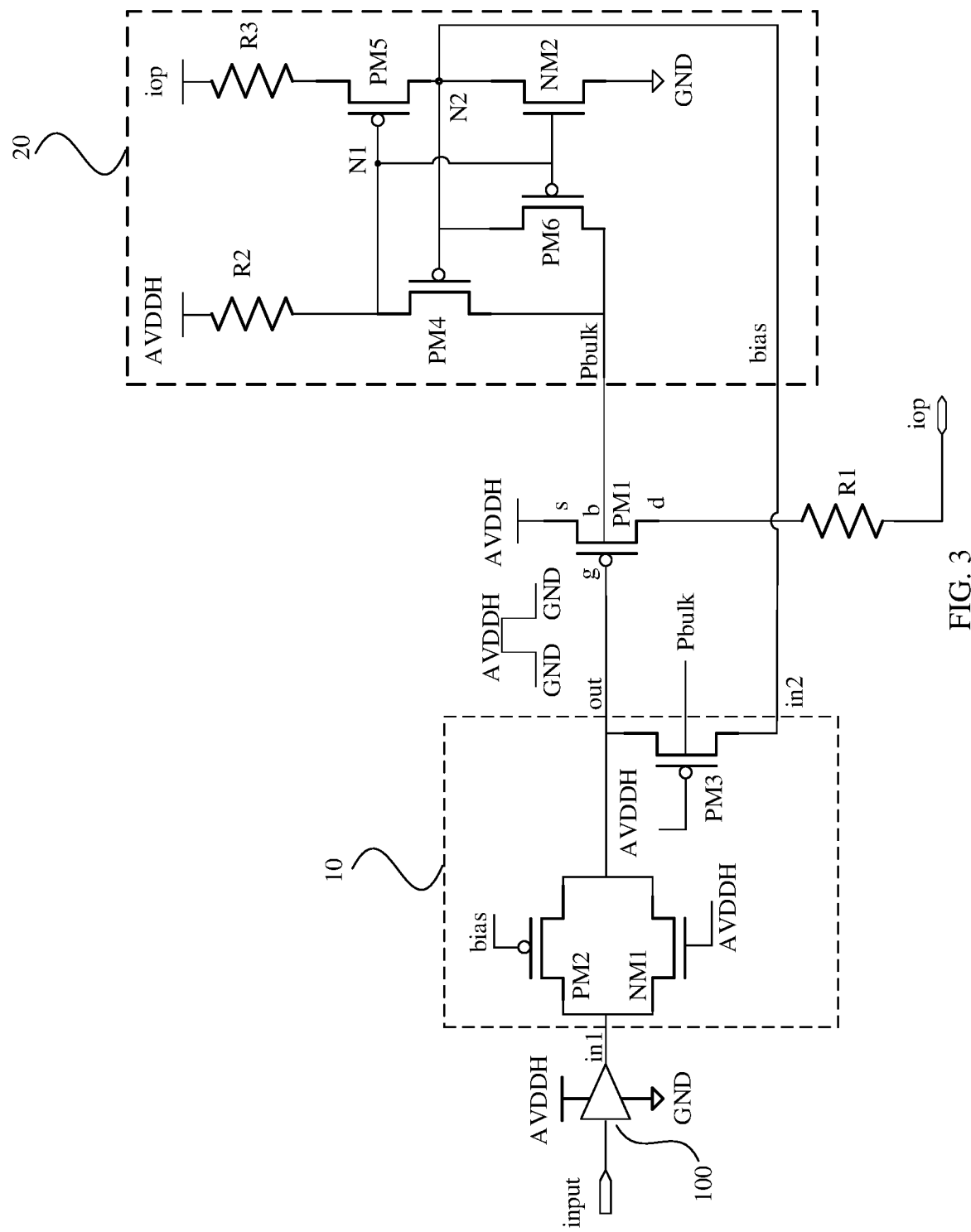
FIG. 3 is a schematic diagram of a structure of an interface circuit according to an embodiment of this application.

For a specific circuit structure of the input signal control circuit 10, for example, with reference to FIG. 3, in some possible implementations, the input signal control circuit 10 may include a second PMOS transistor PM2, a first NMOS transistor NM1, and a third PMOS transistor PM3.

Refer to FIG. 3. A gate of the second PMOS transistor PM2 is connected to the bias voltage generation end bias, a source of the second PMOS transistor PM2 is connected to the output end of the input buffer circuit 100 by using the first input end in1 of the input signal control circuit 10, and a drain of the second PMOS transistor PM2 is connected to the gate of the first PMOS transistor PM1 by using the output end out of the input signal control circuit 10.

Refer to FIG. 3. A gate of the first NMOS transistor NM1 is connected to the high-level power supply end AVDDH, a drain of the first NMOS transistor NM1 is connected to the output end of the input buffer circuit 100 by using the first input end in1 of the input signal control circuit 10, and a source of the first NMOS transistor NM1 is connected to the gate of the first PMOS transistor PM1 by using the output end out of the input signal control circuit 10.

Refer to FIG. 3. A gate of the third PMOS transistor PM3 is connected to the high-level power supply end AVDDH, a source of the third PMOS transistor PM3 is connected to the second input end in2 of the input signal control circuit 10 (that is, connected to the bias voltage generation end bias by using the second input end in2), and a drain of the third PMOS transistor PM3 is connected to the gate of the first PMOS transistor PM1 by using the output end out of the input signal control circuit 10.

In this case, with reference to FIG. 3, for the control of the input signal control circuit 10,
when the high-level power supply end AVDDH is normally powered on (3.3 V), and the interface circuit is in the normal working state:
a first bias voltage $V_{b1}$ of the bias voltage generation end bias connected to the gate of the second PMOS transistor PM2 is at a low level, the high-level power supply end AVDDH connected to the gate of the first NMOS transistor NM1 is at a high level, and a CMOS switching transistor formed by the second PMOS transistor PM2 and the first NMOS transistor NM1 is in a conducted state. Specifically, when a high level is input by the first input end in1, the second PMOS transistor PM2 is conducted; or when a low level is input by the first input end in1, the first NMOS transistor NM1 is conducted. In this way, after the voltage of the signal input end input is adjusted by the input buffer circuit 100, the adjusted voltage is output to the output end out of the input signal control circuit 10 after passing through the conducted CMOS switching transistors (NM1 and PM2). In addition, the third PMOS transistor PM3 is in a cut-off state under the control of the voltage of the high-level power supply end AVDDH.

In other words, when the interface circuit is in the normal working state, the third PMOS transistor PM3 is cut off and a CMOS switching transistor formed by the second PMOS transistor PM2 and the first NMOS transistor NM1 is in a conducted state, so as to ensure that a potential of the output end out of the input signal control circuit 10 follows a potential of the first input end in1.

When the high-level power supply end AVDDH is powered off (that is, at a low potential, which is 0 V), the input/output end iop is externally connected to a high-level signal (that is, at a high potential, which is about 3.3 V), and the interface circuit is in the current backflow prevention state:
the second PMOS transistor PM2 is in a cut-off state under the control of the second bias voltage $V_{b2}$ of the bias voltage generation end bias, the first NMOS transistor NM1 is in a cut-off state under the control of the low potential (0 V) of the high-level power supply end AVDDH, and the third PMOS transistor PM3 is in a conducted state under the control of the low potential (0 V) of the high-level power supply end AVDDH. In addition, the input signal control circuit 10 outputs the second bias voltage $V_{b2}$ of the bias voltage generation end bias to the output end out of the input signal control circuit 10 by using the second input end in2.

In other words, when the interface circuit is in the current backflow prevention state, the second PMOS transistor PM2 and the first NMOS transistor NM1 are cut off, the third PMOS transistor PM3 is conducted, and a voltage output by the output end out of the input signal control circuit 10 is the second bias voltage $V_{b2}$ (which may be equal to the potential of the input/output end iop; refer to the following related descriptions for details).

For a specific circuit structure of the bias circuit 20,
for example, with reference to FIG. 3, in some possible implementations, the bias circuit 20 may include a second resistor R2, a third resistor R3, a fourth PMOS transistor PM4, a fifth PMOS transistor PM5, a sixth PMOS transistor PM6, and a second NMOS transistor NM2.

Refer to FIG. 3. One end (a first end) of the second resistor R2 is connected to the high-level power supply end AVDDH, and the other end (a second end) of the second resistor R2 is connected to a first node N1. In other words, the second resistor R2 is connected between the high-level power supply end AVDDH and the first node N1.

It may be understood herein that a "node" (for example, N1) in a circuit refers to a connection point of two or more branches, and a plurality of adjacent nodes (that is, no component is disposed between the nodes) may be generally equivalent to a same node. This is applicable to nodes (for example, N2, N3, and N4) involved in the following descriptions, and details are not described again.

Refer to FIG. 3. One end (a first end) of the third resistor R3 is connected to the input/output end iop, and the other end (a second end) of the third resistor R3 is connected to a source of the fifth PMOS transistor PM5. In other words, the third resistor R3 is connected between the input/output end iop and the source of the fifth PMOS transistor PM5.

Refer to FIG. 3. A gate of the fourth PMOS transistor PM4 is connected to a second node N2, a source of the fourth PMOS transistor PM4 is connected to the first node N1, and a drain of the fourth PMOS transistor PM4 is connected to the substrate bias voltage generation end Pbulk.

Refer to FIG. 3. A gate of the fifth PMOS transistor PM5 is connected to the first node N1, a source of the fifth PMOS transistor PM5 is connected to the second end of the third resistor R3, and a drain of the fifth PMOS transistor PM5 is connected to the second node N2.

Refer to FIG. 3. A gate of the sixth PMOS transistor PM6 is connected to the first node N1, a source of the sixth PMOS transistor PM6 is connected to the second node N2, and a drain of the sixth PMOS transistor PM6 is connected to the substrate bias voltage generation end Pbulk.

Refer to FIG. 3. A gate of the second NMOS transistor NM2 is connected to the first node N1, a source of the second NMOS transistor NM2 is connected to the ground end GND, and a drain of the second NMOS transistor NM2 is connected to the second node N2.

In this case, with reference to FIG. 3, for the control of the PMOS transistors in the bias circuit 20,
when the high-level power supply end AVDDH is normally powered on (3.3 V), and the interface circuit is in the normal working state:
the first node N1 is at a high potential under the control of the high potential (3.3 V) of the high-level power supply end AVDDH; and under the control of the first node N1, the fifth PMOS transistor PM5 and the sixth PMOS transistor PM6 are cut off, the second NMOS transistor NM2 is conducted, and a potential (0 V, used as the first bias voltage $V_{b1}$) of the ground end GND is output to the bias voltage generation end bias. In addition, because the second NMOS transistor NM2 is conducted and the second node N2 is at a low potential (that is, the potential of the ground end GND), the fourth PMOS transistor PM4 is conducted under the control of the second node N2, and the high potential (3.3 V, used as the first substrate bias voltage $V_{a1}$) of the high-level power supply end AVDDH is output to the substrate bias voltage generation end Pbulk.

In other words, when the interface circuit is in the normal working state, the fifth PMOS transistor PM5 and the sixth PMOS transistor PM6 are cut off, and the second NMOS transistor NM2 and the fourth PMOS transistor PM4 are conducted; and the first bias voltage $V_{b1}$ output by the bias voltage generation end bias is the potential (0 V) of the ground end GND, and the first substrate bias voltage $V_{a1}$ output by the substrate bias voltage generation end Pbulk is the high potential (about 3.3 V) of the high-level power supply end AVDDH.

When the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:

the first node N1 is at a low potential under the control of the low potential (0 V) of the high-level power supply end AVDDH; and under the control of the first node N1, the second NMOS transistor NM2 is cut off, the fifth PMOS transistor PM5 and the sixth PMOS transistor PM6 are conducted, the high potential (3.3 V) of the input/output end iop is output to the bias voltage generation end bias (that is, the second bias voltage $V_{b2}$ is equal to the potential 3.3 V of the input/output end iop), and the high potential (3.3 V, used as the second substrate bias voltage $V_{a2}$) of the input/output end iop is output to the substrate bias voltage generation end Pbulk. In addition, because the fifth PMOS transistor PM5 is conducted and the second node N2 is at a high potential (that is, the potential of the input/output end iop), the fourth PMOS transistor PM4 is cut off under the control of the second node N2.

In other words, when the interface circuit is in the current backflow prevention state, the second NMOS transistor NM2 and the fourth PMOS transistor PM4 are cut off, the fifth PMOS transistor PM5 and the sixth PMOS transistor PM6 are conducted, the second bias voltage $V_{b2}$ output by the bias voltage generation end bias is the potential (about 3.3 V) of the input/output end iop, and the second substrate bias voltage $V_{a2}$ output by the substrate bias voltage generation end Pbulk is the potential (about 3.3 V) of the input/output end iop.

It needs to be noted herein that, in this embodiment, substrates of all PMOS transistors may be connected to the substrate bias voltage generation end Pbulk, and substrates of all NMOS transistors may be connected to the ground end GND; and the accompanying drawings show a connection of the substrate bias voltage generation end Pbulk to substrates of only some MOS transistors.

In conclusion, as shown in FIG. 3, with reference to the input signal control circuit 10 and the bias circuit 20, the following describes a control process of the first PMOS transistor PM1 when the entire interface circuit is in the normal working state and that when the entire interface circuit is the current backflow prevention state.

When the high-level power supply end AVDDH is normally powered on (3.3 V), and the interface circuit is in the normal working state:

the input buffer circuit 100 adjusts a signal amplitude input by the signal input end input to a voltage amplitude (3-3 V) between the high-level power supply end AVDDH (3.3 V) and the ground end GND (0 V), and then outputs the adjusted signal amplitude to the first input end in1 of the input signal control circuit 10, where the output end out of the input signal control circuit 10 follows the voltage of the first input end in1; and the first PMOS transistor PM1 is conducted or cut off under the control of a potential of the output end out of the input signal control circuit 10. In this way, after passing through the first PMOS transistor PM1 and the first resistor R1, the potential of the high-level power supply end AVDDH is output to the input/output end iop, so as to meet a normal working requirement of the interface circuit.

In addition, when the interface circuit is in the normal working state, the bias circuit 20 inputs the first substrate bias voltage $V_{a1}$ (about 3.3 V) to the substrate of the first PMOS transistor PM1 by using the substrate bias voltage generation end Pbulk, so that a parasitic diode in the first PMOS transistor PM1 is in a reverse bias state, thereby ensuring normal working of the first PMOS transistor PM1.

For analysis of a process in which the substrate bias voltage generation end Pbulk of the bias circuit 20 generates the first substrate bias voltage $V_{a1}$ (about 3.3 V), refer to the foregoing related descriptions of the bias circuit 20. Details are not described herein again.

When the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:

the second input end in2 of the input signal control circuit 10 outputs the second bias voltage $V_{b2}$ (about 3.3 V) of the bias voltage generation end bias to the gate g of the first PMOS transistor PM1 by using the output end out, and controls the first PMOS transistor PM1 to be cut off. In addition, the substrate of the first PMOS transistor PM1 receives the second substrate bias voltage V2 (about 3.3 V) generated by the substrate bias voltage generation end Pbulk, so that the parasitic diode of the first PMOS transistor PM1 is in a reverse bias state, to avoid current leakage, thereby ensuring that the high potential (3.3 V) of the input/output end iop does not perform a current backflow to the high-level power supply end AVDDH.

For analysis of a process in which the bias voltage generation end bias of the bias circuit 20 generates the second bias voltage $V_{b2}$ (about 3.3 V) and a process in which the substrate bias voltage generation end Pbulk generates the second substrate bias voltage $V_{a2}$ (about 3.3 V), refer to the foregoing related descriptions of the bias circuit 20.

In addition, an embodiment of this application further provides a method for controlling the interface circuit provided in Embodiment 1. Refer to FIG. 3. The control method includes:

when the high-level power supply end AVDDH is normally powered on (3.3 V), controlling the input signal control circuit 10 to output an electrical signal input by the signal input end input to the gate of the first PMOS transistor PM1, and controlling the bias circuit 20 to input, by using the substrate bias voltage generation end Pbulk, a voltage (the first substrate bias voltage $V_{a1}$, which is about 3.3 V) of the high-level power supply end AVDDH to the substrate of the first PMOS transistor PM1, to control the first PMOS transistor PM1 to be conducted or cut off, so that a potential of the high-level power supply end AVDDH, after passing through the first PMOS transistor PM1 and the first resistor R1, is output as required to the input/output end iop, thereby ensuring that the interface circuit is in the normal working state; or when the high-level power supply end AVDDH is powered off (0 V), and the input/output end iop is externally connected to a high-level signal (that is, at a high potential, which is 3.3 V), controlling the input signal control circuit 10 to output an electrical signal (that is, the second bias voltage $V_{b2}$, about 3.3 V) of the bias voltage generation end bias of the bias circuit 20 to the gate of the first PMOS transistor PM1, so as to control the first PMOS transistor PM1 to be cut off; and controlling the bias circuit 20 to input, by using the substrate bias voltage generation end Pbulk, a voltage (that is, the second substrate bias voltage $V_{a2}$, about 3.3 V) of the input/output end iop to the substrate of the first PMOS transistor PM1, so that the parasitic diode in the first PMOS transistor PM1 is in a reverse bias state to avoid current leakage, thereby ensuring that the high potential (3.3 V) of the input/output end iop does not perform a current backflow to the high-level power supply end AVDDH and the interface circuit is in the current backflow prevention state.

Embodiment 2

Embodiment 2 describes specific disposition of the interface circuit in a case in which the PMOS transistors in the interface circuit are transistors with a low withstand voltage. For example, in Embodiment 2, a withstand voltage range of the transistors with the low withstand voltage is 1.8 V, the voltage of the high-level power supply end AVDDH is 3.3 V, a voltage of the low-level power supply end AVDDL is 1.6 V, and a voltage of the high-level signal to which the input/output end iop is externally connected is 3.3 V (but this application is not limited thereto). In addition, working states of the interface circuit are described for illustration with reference to the control of each MOS transistor in the interface circuit. It may be understood that a voltage difference between the voltage of the high-level power supply end AVDDH and the voltage of the low-level power supply end AVDDL needs to be less than the withstand voltage range (1.8 V) of the transistors with the low withstand voltage, so as to avoid a risk of over-voltage of the transistors with the low withstand voltage.

Figure 4:
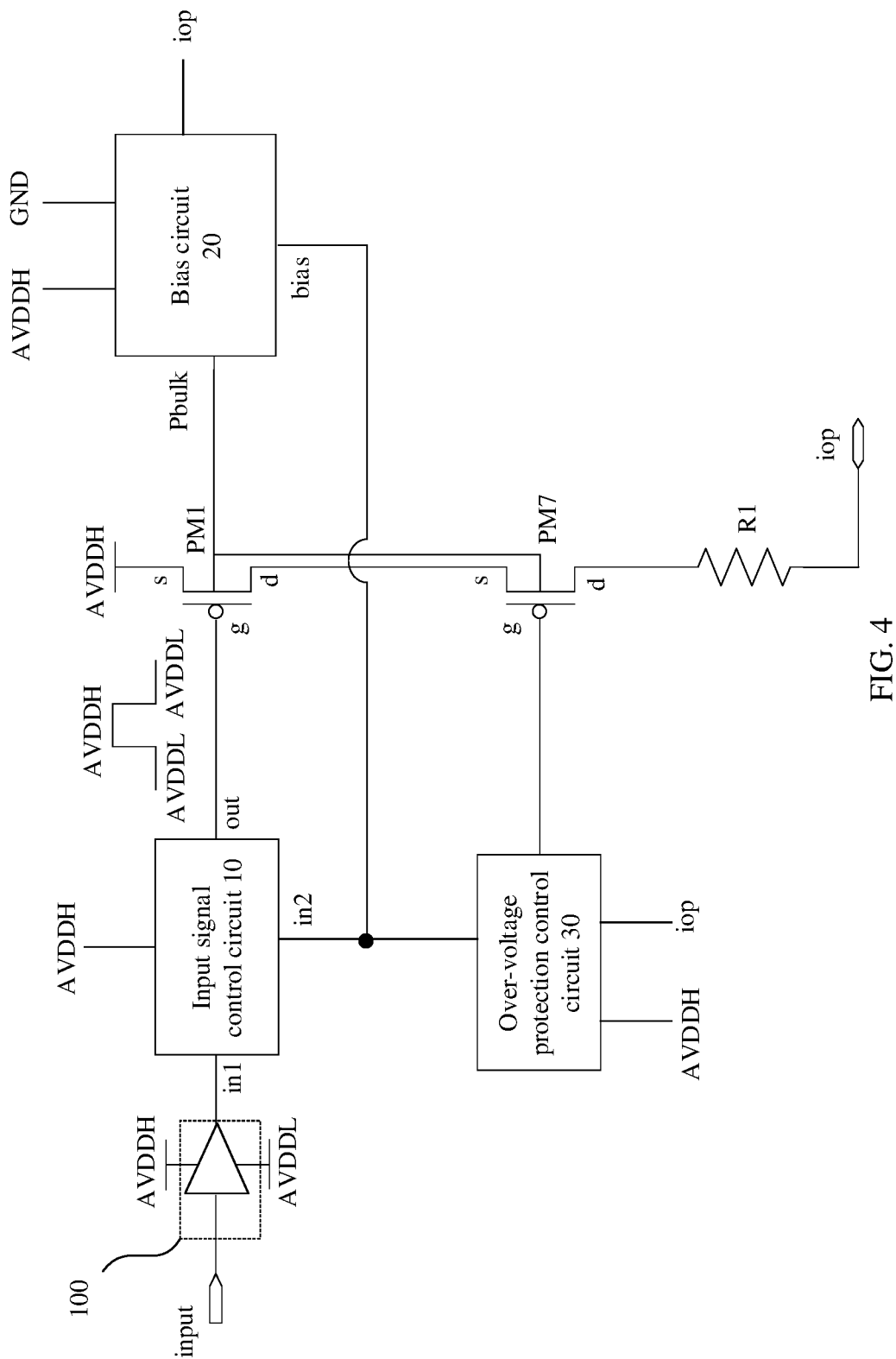
FIG. 4 is a schematic diagram of a structure of an interface circuit according to an embodiment of this application.

Considering that the withstand voltage range of the transistors with the low withstand voltage is relatively small, to avoid over-voltage of the first PMOS transistor PM1, with reference to FIG. 4, Embodiment 2 provides an interface circuit. On a basis of the interface circuit shown in FIG. 2, a seventh PMOS transistor PM7 and an over-voltage protection control circuit 30 are added, to protect the first PMOS transistor PM1 by controlling the seventh PMOS transistor PM7, so as to avoid over-voltage of the first PMOS transistor PM1.

The following describes specific disposition of the seventh PMOS transistor PM7, the over-voltage protection control circuit 30, and the bias circuit 20 in the interface circuit in Embodiment 2.

Refer to FIG. 4. The over-voltage protection control circuit 30 may include an over-voltage protection output end P1, and the over-voltage protection control circuit 30 is connected to the high-level power supply end AVDDH, the bias voltage generation end bias, and the input/output end iop.

Refer to FIG. 4. A gate g of the seventh PMOS transistor PM7 is connected to the over-voltage protection output end P1, a source s of the seventh PMOS transistor PM7 is connected to the drain d of the first PMOS transistor PM1, and a drain d of the seventh PMOS transistor PM7 is connected to the input/output end iop by using the first resistor R1.

When the high-level power supply end AVDDH is normally powered on (3.3 V), and the interface circuit is in the normal working state:

the over-voltage protection control circuit 30 outputs the first bias voltage $V_{b1}$ (about 1.65 V; refer to the following related descriptions for details) of the bias voltage generation end bias to the gate of the seventh PMOS transistor PM7, so as to control a conducted or cutoff state of the seventh PMOS transistor PM7 to be consistent with that of the first PMOS transistor PM1, thereby ensuring normal working of the interface circuit.

When the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:

the over-voltage protection control circuit 30 outputs the voltage (about 3.3 V) of the input/output end iop to the gate of the seventh PMOS transistor PM7, to control the seventh PMOS transistor PM7 to be cut off, thereby avoiding a current backflow from the high potential (3.3 V) of the input/output end iop to the high-level power supply end AVDDH and also protecting the first PMOS transistor PM1 against over-voltage.

Figure 5:
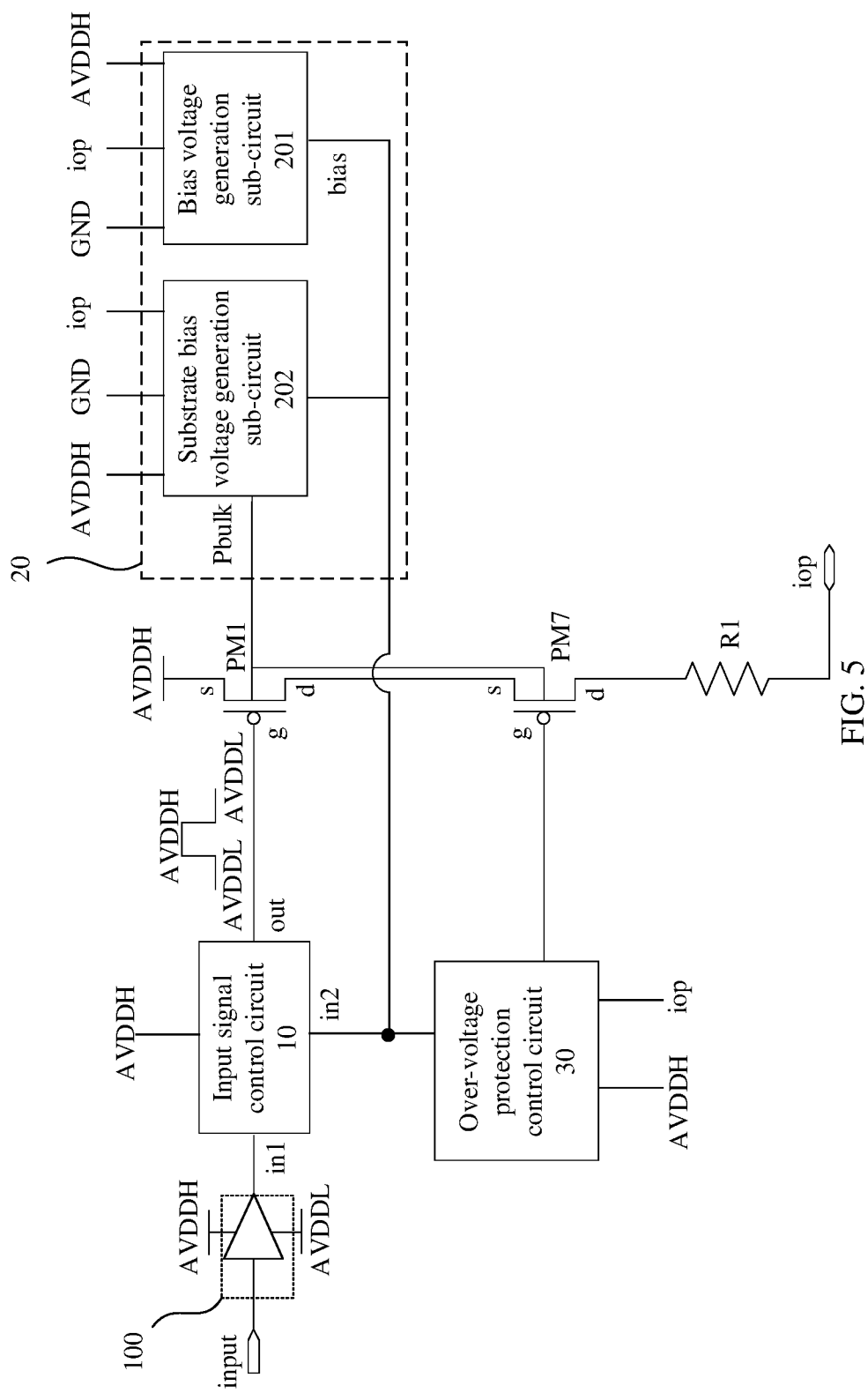
FIG. 5 is a schematic diagram of a structure of an interface circuit according to an embodiment of this application.

In addition, the bias circuit 20 in Embodiment 2 differs from the bias circuit 20 in Embodiment 1 to some extent in disposition. As shown in FIG. 5, in this embodiment, the bias circuit 20 may include a bias voltage generation sub-circuit 201 and a substrate bias voltage generation sub-circuit 202.

Refer to FIG. 5. In the bias circuit 20, the bias voltage generation sub-circuit 201 is connected to the bias voltage generation end bias, the high-level power supply end AVDDH, the input/output end iop, and the ground end GND; and the substrate bias voltage generation sub-circuit 202 is connected to the substrate bias voltage generation end Pbulk, the high-level power supply end AVDDH, the input/output end iop, and the bias voltage generation end bias.

When the high-level power supply end AVDDH is normally powered on (3.3 V), and the interface circuit is in the normal working state:

the bias voltage generation sub-circuit 201 outputs, under the control of each connected end, an intermediate voltage (about 1.65 V) between the high-level power supply end AVDDH (3.3 V) and the ground end GND (0 V) as the first bias voltage $V_{b1}$ to the bias voltage generation end bias; and the substrate bias voltage generation sub-circuit 202 outputs, under the control of each connected end, the voltage (3.3 V) of the high-level power supply end AVDDH as the first substrate bias voltage $V_{a1}$ to the substrate bias voltage generation end Pbulk.

When the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:

the bias voltage generation sub-circuit 201 outputs, under the control of each connected end, an intermediate voltage between the input/output end iop (3.3 V) and the ground end GND (0 V) as the second bias voltage $V_{b2}$ (about 1.65 V) to the bias voltage generation end bias; and the substrate bias voltage generation sub-circuit 202 outputs, under the control of each connected end, the voltage (3.3 V) of the input/output end iop as the second substrate bias voltage $V_{a2}$ to the substrate bias voltage generation end Pbulk.

The following provides a specific circuit structure of the bias voltage generation sub-circuit 201, the substrate bias voltage generation sub-circuit 202, and the over-voltage protection control circuit 30 each for illustration.

Figure 6:
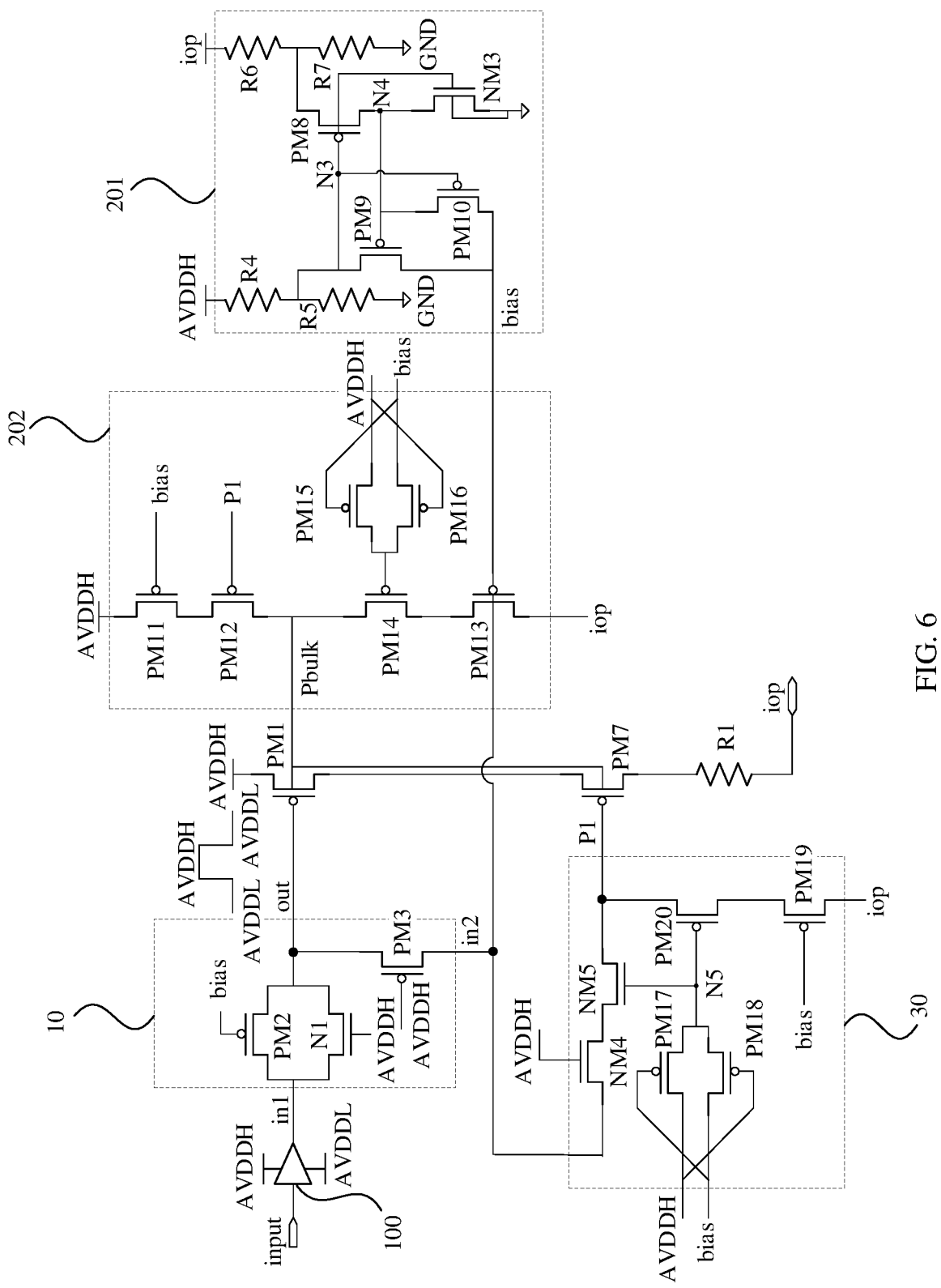
FIG. 6 is a schematic diagram of a structure of an interface circuit according to an embodiment of this application.

For a specific circuit structure of the bias voltage generation sub-circuit 201, for example, with reference to FIG. 6, in some possible implementations, the bias voltage generation sub-circuit 201 may include a fourth resistor R4, a fifth resistor R5, a sixth resistor R6, a seventh resistor R7, an eighth PMOS transistor PM8, a ninth PMOS transistor PM9, a tenth PMOS transistor PM10, and a third NMOS transistor NM3. Resistance values of the fourth resistor R4 and the sixth resistor R6 are the same or approximately the same, and resistance values of the fifth resistor R5 and the seventh resistor R7 are the same or approximately the same. Certainly, resistance values of the fourth resistor R4, the fifth resistor R5, the sixth resistor R6, and the seventh resistor R7 may be the same or approximately the same. The following embodiments are described by using R4=R5=R6=R7 as an example.

Refer to FIG. 6. The fourth resistor R4 and the fifth resistor R5 are connected in series between the high-level power supply end AVDDH and the ground end GND, and a connection node between the fourth resistor R4 and the fifth resistor R5 is connected to a third node N3. In other words, a first end of the fourth resistor R4 is connected to the high-level power supply end AVDDH, a second end of the fourth resistor R4 is connected to a first end of the fifth resistor R5, a second end of the fifth resistor R5 is connected to the ground end GND, and both the second end of the fourth resistor R4 and the first end of the fifth resistor R5 are connected to the third node N3.

Refer to FIG. 6. The sixth resistor R6 and the seventh resistor R7 are connected in series between the input/output end iop and the ground end GND, and a connection node between the sixth resistor R6 and the seventh resistor R7 is connected to a source of the eighth PMOS transistor PM8. In other words, a first end of the sixth resistor R6 is connected to the input/output end iop, a second end of the sixth resistor R6 is connected to a first end of the seventh resistor R7, a second end of the seventh resistor R7 is connected to the ground end GND, and both the second end of the sixth resistor R6 and the first end of the seventh resistor R7 are connected to a source of the eighth PMOS transistor PM8.

Refer to FIG. 6. A gate of the eighth PMOS transistor PM8 is connected to the third node N3, the source of the eighth PMOS transistor PM8 is connected to the connection node (that is, the second end of the sixth resistor R6 and the first end of the seventh resistor R7) between the sixth resistor R6 and the seventh resistor R7, and a drain of the eighth PMOS transistor PM8 is connected to a fourth node N4.

Refer to FIG. 6. A gate of the ninth PMOS transistor PM9 is connected to the fourth node N4, a source of the ninth PMOS transistor PM9 is connected to the third node N3, and a drain of the ninth PMOS transistor PM9 is connected to the bias voltage generation end bias.

Refer to FIG. 6. A gate of the tenth PMOS transistor PM10 is connected to the third node N3, a source of the tenth PMOS transistor PM10 is connected to the fourth node N4, and a drain of the tenth PMOS transistor PM10 is connected to the bias voltage generation end bias.

Refer to FIG. 6. A gate of the third NMOS transistor NM3 is connected to the third node N3, a source of the third NMOS transistor NM3 is connected to the ground end GND, and a drain of the third NMOS transistor NM3 is connected to the fourth node N4.

In this case, for the control of each MOS transistor in the bias voltage generation sub-circuit 201, when the high-level power supply end AVDDH is normally powered on (3.3 V), and the interface circuit is in the normal working state:

the third node N3 follows an intermediate voltage (about 1.65 V) of the fourth resistor R4 and the fifth resistor R5 to the high-level power supply end AVDDH; under the control of the high potential of the third node N3, the eighth transistor PM8 and the tenth transistor PM10 are cut off, and the third NMOS transistor NM3 is conducted; because the third NMOS transistor NM3 is conducted, the fourth node N4 follows the voltage (0 V) of the ground end, under the control of the low potential of the fourth node N4, the ninth PMOS transistor PM9 is conducted, and the voltage (that is, the intermediate voltage of the fourth resistor R4 and the fifth resistor R5 to the high-level power supply end AVDDH) of the third node N3 is output as the first bias voltage $V_{b1}$ (about 1.65 V) to the bias voltage generation end bias.

In other words, when the interface circuit is in the normal working state: in the bias voltage generation sub-circuit 201, the eighth PMOS transistor PM8 and the tenth PMOS transistor PM10 are cut off, the third NMOS transistor NM3 and the ninth PMOS transistor PM9 are conducted, and the first bias voltage $V_{b1}$ output by the bias voltage generation end bias is the intermediate voltage (about 1.65 V) of the fourth resistor R4 and the fifth resistor R5 to the high-level power supply end AVDDH.

It needs to be noted herein that the "intermediate voltage" does not absolutely mean ½ voltage division. Using an intermediate voltage of the high-level power supply end AVDDH as an example, the intermediate voltage may be about ½ division of a voltage between the high-level power supply end AVDDH and the ground end GND, for example, 1.64 V, 1.65 V, 1.66 V, or 1.67 V.

When the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:

the third node N3 follows the voltage (0 V) of the high-level power supply end AVDDH; under the control of the low potential of the third node N3, the third NMOS transistor NM3 is cut off, and the eighth PMOS transistor PM8 and the tenth PMOS transistor PM10 are conducted, so that an intermediate voltage of the sixth resistor R6 and the seventh resistor R7 to the voltage (3.3 V) of the input/output end iop is output as the second bias voltage $V_{b2}$ (about 1.65 V) to the bias voltage generation end bias. In addition, a potential of the fourth node N4 follows the intermediate voltage (about 1.65 V) of the sixth resistor R6 and the seventh resistor R7 to the voltage of the input/output end iop; and the ninth PMOS transistor PM9 is cut off under the control of the low potential of the fourth node N4.

In other words, when the interface circuit is in the current backflow prevention state, in the bias voltage generation sub-circuit 201, the third NMOS transistor NM3 and the ninth PMOS transistor PM9 are cut off, the eighth PMOS transistor PM8 and the tenth PMOS transistor PM10 are conducted, and the second bias voltage $V_{b2}$ output by the bias voltage generation end bias is the intermediate voltage (about 1.65 V) of the sixth resistor R6 and the seventh resistor R7 to the input/output end iop.

For a specific circuit structure of the substrate bias voltage generation sub-circuit 202, for example, with reference to FIG. 6, in some possible implementations, the substrate bias voltage generation sub-circuit 202 may include an eleventh PMOS transistor PM11, a twelfth PMOS transistor PM12, a thirteenth PMOS transistor PM13, a fourteenth PMOS transistor PM14, a fifteenth PMOS transistor PM15, and a sixteenth PMOS transistor PM16.

Refer to FIG. 6. A gate of the eleventh PMOS transistor PM11 is connected to the bias voltage generation end bias, a source of the eleventh PMOS transistor PM11 is connected to the high-level power supply end AVDDH, and a drain of the eleventh PMOS transistor PM11 is connected to a source of a twelfth PMOS transistor PM12. A gate of the twelfth PMOS transistor PM12 is connected to the over-voltage protection output end P1 of the over-voltage protection control circuit 30, and a drain of the twelfth PMOS transistor PM12 is connected to the substrate bias voltage generation end Pbulk.

It needs to be noted herein that, the connection between the gate of the twelfth PMOS transistor PM12 and the over-voltage protection output end P1 of the over-voltage protection control circuit 30 is based on that, an output signal of the over-voltage protection output end P1 of the over-voltage protection control circuit 30 can meet a signal requirement of the gate of the twelfth PMOS transistor PM12. Therefore, for circuit simplicity, the gate of the twelfth PMOS transistor PM12 may be directly connected to the over-voltage protection output end P1. Certainly, in some other possible implementations, a circuit structure that is the same as or different from the over-voltage protection control circuit 30 may be separately disposed in the substrate bias voltage generation sub-circuit 202, so as to separately provide a control signal for the gate of the twelfth PMOS transistor PM12, thereby meeting a control requirement of the twelfth PMOS transistor PM12.

Refer to FIG. 6. A gate of the thirteenth PMOS transistor PM13 is connected to the bias voltage generation end bias, a source of the thirteenth PMOS transistor PM13 is connected to the input/output end iop, a drain of the thirteenth PMOS transistor PM13 is connected to a source of the fourteenth PMOS transistor PM14, and a drain of the fourteenth PMOS transistor PM14 is connected to the substrate bias voltage generation end Pbulk.

Refer to FIG. 6. A gate of the fifteenth PMOS transistor PM15 is connected to the bias voltage generation end bias, a source of the fifteenth PMOS transistor PM15 is connected to the high-level power supply end AVDDH, and a drain of the fifteenth PMOS transistor PM15 is connected to a gate of the fourteenth PMOS transistor PM14. A gate of the sixteenth PMOS transistor PM16 is connected to the high-level power supply end AVDDH, a source of the sixteenth PMOS transistor PM16 is connected to the bias voltage generation end bias, and a drain of the sixteenth PMOS transistor PM16 is connected to the gate of the fourteenth PMOS transistor PM14.

It may be understood herein that, the fifteenth PMOS transistor PM15 and the sixteenth PMOS transistor PM16 form a selection circuit, which can output a higher one of the potentials of the high-level power supply end AVDDH and the bias voltage generation end bias to the gate of the fourteenth PMOS transistor PM14, so as to control the fourteenth PMOS transistor PM14. Specifically, when the potential of the high-level power supply end AVDDH is higher than the potential of the bias voltage generation end bias, the fifteenth PMOS transistor PM15 is conducted, and the sixteenth PMOS transistor PM16 is cut off, so that the high potential of the high-level power supply end AVDDH is output to the gate of the fourteenth PMOS transistor PM14; or when the potential of the bias voltage generation end bias is higher than the potential of the high-level power supply end AVDDH, the fifteenth PMOS transistor PM15 is cut off, and the sixteenth PMOS transistor PM16 is conducted, so that the high potential of the bias voltage generation end bias is output to the gate of the fourteenth PMOS transistor PM14.

For the control of each MOS transistor in the substrate bias voltage generation sub-circuit 202, when the high-level power supply end AVDDH is normally powered on (3.3 V), and the interface circuit is in the normal working state:

the eleventh PMOS transistor PM11 is conducted under the control of the first bias voltage $V_{b1}$ (about 1.65 V) of the bias voltage generation end bias; and the twelfth PMOS transistor PM12 is conducted under the control of a voltage (about 1.65 V; refer to the following related descriptions for details) of the over-voltage protection output end P1, so as to output the voltage (3.3 V) of the high-level power supply end AVDDH as the first substrate bias voltage $V_{a1}$ to the substrate bias voltage generation end Pbulk In addition, because the potential (3.3 V) of the high-level power supply end AVDDH is higher than the first bias voltage $V_{b1}$ (about 1.65 V) of the bias voltage generation end bias, the sixteenth PMOS transistor PM16 is cut off, and the fifteenth PMOS transistor PM15 is conducted, so that the high potential (3.3 V) of the high-level power supply end AVDDH is output to the gate of the fourteenth PMOS transistor PM14 by using the fifteenth PMOS transistor PM15, and the fourteenth PMOS transistor PM14 is cut off. The thirteenth PMOS transistor PM13 is in a cut-off or conducted state under the control of the first bias voltage $V_{b1}$ (about 1.65 V) of the bias voltage generation end bias and the high or low potential (3.3 V or 0 V) of the input/output end iop. Specifically, when the input/output end iop is at the high potential (3.3 V), the thirteenth PMOS transistor PM13 is conducted; or when the input/output end iop is at the low potential (0 V), the thirteenth PMOS transistor PM13 is cut off, and a voltage between the fourteenth PMOS transistor PM14 and the thirteenth PMOS transistor PM13 is maintained to be slightly higher than the voltage of the bias voltage generation end bias, so as to achieve a function of protecting the fourteenth PMOS transistor PM14.

In other words, when the interface circuit is in the normal working state, in the substrate bias voltage generation sub-circuit 202, both the fourteenth PMOS transistor PM14 and the sixteenth PMOS transistor PM16 are cut off; the fifteenth PMOS transistor PM15, the eleventh PMOS transistor PM11, and the twelfth PMOS transistor PM12 are all conducted; the conduction or cutoff of the thirteenth PMOS transistor PM13 depends whether the potential of the input/output end iop is high or low; and the first substrate bias voltage $V_a$ output by the substrate bias voltage generation end Pbulk is the voltage (about 3.3 V) of the high-level power supply end AVDDH.

When the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:

the eleventh PMOS transistor PM11 is cut off under the control of the second bias voltage $V_{b2}$ (about 1.65 V) of the bias voltage generation end bias; and the twelfth PMOS transistor PM12 is cut off under the control of the voltage (about 3.3 V; refer to the following related descriptions for details) of the over-voltage protection output end P1.

In addition, the thirteenth PMOS transistor PM13 is conducted under the control of the second bias voltage $V_{b2}$ (about 1.65 V) of the bias voltage generation end bias; and because the second bias voltage $V_{b2}$ (about 1.65 V) of the bias voltage generation end bias is higher than the potential (0 V) of the high-level power supply end AVDDH, the fifteenth PMOS transistor PM15 is cut off, the sixteenth PMOS transistor PM16 is conducted, and the second bias voltage $V_{b2}$ of the bias voltage generation end bias is output to the gate of the fourteenth PMOS transistor PM14 by using the sixteenth PMOS transistor PM16, so that the fourteenth PMOS transistor PM14 is conducted. In this case, the voltage (3.3 V) of the input/output end iop is output, by using the conducted thirteenth PMOS transistor PM13 and the conducted fourteenth PMOS transistor PM14, to the substrate bias voltage generation end Pbulk, that is, the voltage (3.3 V) of the input/output end iop is output as the second substrate bias voltage $V_{a2}$ to the substrate bias voltage generation end Pbulk.

In other words, when the interface circuit is in the current backflow prevention state, in the substrate bias voltage generation sub-circuit 202, the eleventh PMOS transistor PM11, the twelfth PMOS transistor PM12, and the fifteenth PMOS transistor PM15 are all cut off; the thirteenth PMOS transistor PM13, the fourteenth PMOS transistor PM14, and the sixteenth PMOS transistor PM16 are all conducted; and the second substrate bias voltage $V_{a2}$ output by the substrate bias voltage generation end Pbulk is the voltage (about 3.3 V) of the input/output end iop.

For a specific circuit structure of the over-voltage protection control circuit 30, with reference to FIG. 6, in some possible implementations, the over-voltage protection control circuit 30 may include a fourth NMOS transistor NM4, a fifth NMOS transistor NM5, a seventeenth PMOS transistor PM17, an eighteenth PMOS transistor PM18, a nineteenth PMOS transistor PM19, and a twentieth PMOS transistor PM20.

As shown in FIG. 6, a gate of the fourth NMOS transistor NM4 is connected to the high-level power supply end AVDDH, a source of the fourth NMOS transistor NM4 is connected to a drain of the fifth NMOS transistor NM5, a drain of the fourth NMOS transistor NM4 is connected to the bias voltage generation end bias, a source of the fifth NMOS transistor NM5 is connected to the over-voltage protection output end P1, and a gate of the fifth NMOS transistor NM5 is connected to a fifth node N5.

Refer to FIG. 6. A gate of the seventeenth PMOS transistor PM17 is connected to the bias voltage generation end bias, a source of the seventeenth PMOS transistor PM17 is connected to the high-level power supply end AVDDH, and a drain of the seventeenth PMOS transistor PM17 is connected to the fifth node N5. A gate of the eighteenth PMOS transistor PM18 is connected to the high-level power supply end AVDDH, a source of the eighteenth PMOS transistor PM18 is connected to the bias voltage generation end bias, and a drain of the eighteenth PMOS transistor PM18 is connected to the fifth node N5.

It needs to be noted herein that, the seventeenth PMOS transistor PM17 and the eighteenth PMOS transistor PM18 form a selection circuit, which can output a higher one of the potentials of the high-level power supply end AVDDH and the bias voltage generation end bias to the fifth node N5. Specifically, when the potential of the high-level power supply end AVDDH is higher than the potential of the bias voltage generation end bias, the seventeenth PMOS transistor PM17 is conducted, and the eighteenth PMOS transistor PM18 is cut off, so that the high potential of the high-level power supply end AVDDH is output to the fifth node N5; or when the potential of the bias voltage generation end bias is higher than the potential of the high-level power supply end AVDDH, the seventeenth PMOS transistor PM17 is cut off, and the eighteenth PMOS transistor PM18 is conducted, so that the high potential of the bias voltage generation end bias is output to the fifth node N5.

Refer to FIG. 6. A gate of the nineteenth PMOS transistor PM19 is connected to the bias voltage generation end bias, a source of the nineteenth PMOS transistor PM19 is connected to the input/output end iop, a drain of the nineteenth PMOS transistor PM19 is connected to a source of the twentieth PMOS transistor PM2o, a drain of the twentieth PMOS transistor PM20 is connected to the over-voltage protection output end P1, and a gate of the twentieth PMOS transistor PM20 is connected to the fifth node N5.

In this case, for the control of each MOS transistor in the over-voltage protection control circuit 30, when the high-level power supply end AVDDH is normally powered on (3.3 V), and the interface circuit is in the normal working state:

the potential (3.3 V) of the high-level power supply end AVDDH is higher than the first bias voltage $V_{b1}$ (about 1.65 V) of the bias voltage generation end bias, the seventeenth PMOS transistor PM17 is conducted, and the eighteenth PMOS transistor PM18 is cut off, so that the high potential of the high-level power supply end AVDDH is output to the fifth node N5; and under the control of the high potential (about 3.3 V) of the fifth node N5, the twentieth PMOS transistor PM20 is cut off and the fifth NMOS transistor NM5 is conducted. In addition, the fourth NMOS transistor NM4 is conducted under the control of the potential (3.3 V) of the high-level power supply end AVDDH, so that the first bias voltage $V_{b1}$ (about 1.65 V) of the bias voltage generation end bias is output to the over-voltage protection output end P1, so as to control the conducted or cutoff state of the seventh PMOS transistor PM7 to be consistent with that of the first PMOS transistor PM1.

It needs to be noted herein that, for the control, by using the first bias voltage $V_{b1}$ (about 1.65 V) of the over-voltage protection output end P1, of the conducted or cutoff state of the seventh PMOS transistor PM7 to be consistent with that of the first PMOS transistor PM1, it may be understood that: when the first PMOS transistor PM1 is conducted under the control of the high potential (about 3.3 V) of the output end out of the input signal control circuit 10, the source of the seventh PMOS transistor PM7 and the high-level power supply end AVDDH are equipotential (3.3 V), and the seventh PMOS transistor PM7 is conducted under the control of the first bias voltage $V_{b1}$ (about 1.65 V) of the over-voltage protection output end P1; or when the first PMOS transistor PM1 is cut off under the control of the low potential (about 1.6 V) of the output end out of the input signal control circuit 10, a potential (about 1.6 V) of the source of the seventh PMOS transistor PM7 is close to the low potential of the output end out, and the seventh PMOS transistor PM7 is cut off under the control of the first bias voltage $V_{b1}$ (about 1.65 V) of the over-voltage protection output end P1.

In addition, the nineteenth PMOS transistor PM19 is in a cut-off or conducted state under the control of the first bias voltage $V_{b1}$ (about 1.65 V) of the bias voltage generation end bias and the high or low potential (3.3 V or 0 V) of the input/output end iop. Specifically, when the input/output end iop is at the high potential (3.3 V), the nineteenth PMOS transistor PM19 is conducted; or when the input/output end iop is at the low potential (0 V), the nineteenth PMOS transistor PM19 is cut off, and a voltage between the twentieth PMOS transistor PM20 and the nineteenth PMOS transistor PM19 is maintained to be slightly higher than the voltage (that is, the voltage of bias voltage generation end bias) of the over-voltage protection output end P1, so that voltage differences between the source end, the gate end, and the drain end of the twentieth PMOS transistor PM20 are all less than the withstand voltage, so as to achieve a function of protecting the twentieth PMOS transistor PM20.

In other words, when the interface circuit is in the normal working state, in the over-voltage protection control circuit 30, the fourth NMOS transistor NM4, the fifth NMOS transistor NM5, and the seventeenth PMOS transistor PM17 are all conducted; the eighteenth PMOS transistor PM18, the nineteenth PMOS transistor PM19, and the twentieth PMOS transistor PM20 are all cut off; and the voltage output by the over-voltage protection output end P1 is the first bias voltage $V_{b1}$ (about 1.65 V).

When the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:

the second bias voltage $V_{b2}$ (about 1.65 V) of the bias voltage generation end bias is higher than the potential (0 V) of the high-level power supply end AVDDH, the eighteenth PMOS transistor PM18 is conducted, and the seventeenth PMOS transistor PM17 is cut off, so that the second bias voltage $V_{b2}$ (about 1.65 V) of the bias voltage generation end bias is output to the fifth node N5, and under the control of the potential (about 1.65 V) of the fifth node N5, the fifth NMOS transistor NM5 is cut off and the twentieth PMOS transistor PM20 is conducted; and the fourth NMOS transistor NM4 is cut off under the control of the potential (0 V) of the high-level power supply end AVDDH.

In addition, the nineteenth PMOS transistor PM19 is conducted under the control of the second bias voltage $V_{b2}$ (about 1.65 V) of the bias voltage generation end bias, so that the potential (3.3 V) of the input/output end iop is output, by using the conducted nineteenth PMOS transistor PM19 and the conducted twentieth PMOS transistor PM20, to the over-voltage protection output end P1, so as to control the seventh PMOS transistor PM7 to be cut off, thereby protecting the first PMOS transistor PM1 and preventing a current backflow from the high potential (3.3 V) of the input/output end iop to the high-level power supply end AVDDH.

In other words, when the interface circuit is in the current backflow prevention state, in the over-voltage protection control circuit 30, the fourth NMOS transistor NM4, the fifth NMOS transistor NM5, and the seventeenth PMOS transistor PM17 are all cut off; the eighteenth PMOS transistor PM18, the nineteenth PMOS transistor PM19, and the twentieth PMOS transistor PM20 are all conducted; and the voltage output by the over-voltage protection output end P1 is the potential (about 3.3 V) of the input/output end iop.

It needs to be noted herein that, in this embodiment, substrates of all PMOS transistors may be connected to the substrate bias voltage generation end Pbulk, and substrates of all NMOS transistors may be connected to the ground end GND; and the accompanying drawings show a connection of the substrate bias voltage generation end Pbulk to substrates of only some MOS transistors.

In conclusion, with reference to FIG. 6, the following describes, with reference to the input signal control circuit 10, the bias circuit 20, and the over-voltage protection control circuit 30, control processes of the first PMOS transistor PM1 and the seventh PMOS transistor PM7 in the normal working state and in the current backflow prevention state.

When the high-level power supply end AVDDH is normally powered on (3.3 V), and the interface circuit is in the normal working state:

the input buffer circuit 100 adjusts a signal amplitude input by the signal input end input to a voltage amplitude (1.7 V) between the high-level power supply end AVDDH (3.3 V) and the low-level power supply end AVDDL (1.6 V), and then outputs the adjusted signal amplitude to the first input end in1 of the input signal control circuit 10, where the output end out of the input signal control circuit 10 follows the voltage of the first input end in1, and the first PMOS transistor PM1 is conducted or cut off under the control of the potential of the output end out of the input signal control circuit 1o; and under the control of the first bias voltage $V_{b1}$ (about 1.65 V) output by the over-voltage protection output end P1 of the over-voltage protection control circuit 30, the conducted or cutoff state of the seventh PMOS transistor PM7 is consistent with that of the first PMOS transistor PM1 (refer to the foregoing related analysis for details), so that the potential of the high-level power supply end AVDDH can be output to the input/output end iop after passing through the first PMOS transistor PM1, the seventh PMOS transistor PM7, and the first resistor R1, so as to meet a normal working requirement of the interface circuit.

In addition, when the interface circuit is in the normal working state, the bias circuit 20 inputs the first substrate bias voltage $V_{a1}$ (about 3.3 V) to the substrates of the first PMOS transistor PM1 and the seventh PMOS transistor PM7 by using the substrate bias voltage generation end Pbulk, so that parasitic diodes in the first PMOS transistor PM1 and the seventh PMOS transistor PM7 can be in a reverse bias state, thereby ensuring normal working of the first PMOS transistor PM1 and the seventh PMOS transistor PM7. For analysis of a process in which the substrate bias voltage generation end Pbulk generates the first substrate bias voltage $V_{a1}$ (about 3.3 V), refer to the foregoing related descriptions of the bias circuit 20. Details are not described herein again.

When the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:
the input signal control circuit 10 outputs the second bias voltage $V_{b2}$ (about 1.65 V) of the bias voltage generation end bias to the gate g of the first PMOS transistor PM1 by using the output end out, to control the first PMOS transistor PM1 to be cut off; and the over-voltage protection control circuit 30 outputs a control voltage (the voltage of the input/output end iop, about 3.3 V) to the gate of the seventh PMOS transistor PM7 by using the over-voltage protection output end P1, to control the seventh PMOS transistor PM7 to be cut off. In addition, the substrates of the first PMOS transistor PM1 and the seventh PMOS transistor PM7 receive the second substrate bias voltage $V_{a2}$ (the voltage of the input/output end iop, which is about 3.3 V) generated by the substrate bias voltage generation end Pbulk, so that the parasitic diodes in the first PMOS transistor PM1 and the seventh PMOS transistor PM7 are reversely biased, thereby avoiding leakage and ensuring that the high potential (3.3 V) of the input/output end iop does not perform a current backflow to the high-level power supply end AVDDH.

For the control voltage output by the over-voltage protection control circuit 30 to the gate of the seventh PMOS transistor PM7 by using the over-voltage protection output end P1, the second bias voltage $V_{b2}$ (about 1.65 V) generated by the bias voltage generation end bias of the bias circuit 20, and the second substrate bias voltage $V_{a2}$ (about 3.3 V) generated by the substrate bias voltage generation end Pbulk, refer to the foregoing related analysis processes. Details are not described herein again.

In addition, with reference to FIG. 4, an embodiment of this application further provides a method for controlling the interface circuit provided in Embodiment 2. The control method includes:
when the high-level power supply end AVDDH is normally powered on (3.3 V), and the interface circuit is in the normal working state:
controlling the input signal control circuit 10 to output an electrical signal input by the signal input end input to the gate of the first PMOS transistor PM1, so as to control the first PMOS transistor PM1 to be conducted or cut off; controlling the over-voltage protection control circuit 30 to output the voltage (that is, the first bias voltage $V_{b1}$, about 1.65 V) of the bias voltage generation end bias to the gate of the seventh PMOS transistor PM7, so that the conducted or cutoff state of the seventh PMOS transistor PM7 is consistent with that of the first PMOS transistor PM1; and controlling the bias circuit 20 to input, by using the substrate bias voltage generation end Pbulk, the voltage (that is, the first substrate bias voltage $V_{a1}$, about 3.3 V) of the high-level power supply end AVDDH to the substrates of the first PMOS transistor PM1 and the seventh PMOS transistor PM7, to make the parasitic diodes in the first PMOS transistor PM1 and the seventh PMOS transistor PM7 stay in a reverse bias state, so that the potential of the high-level power supply end AVDDH, after passing through the first PMOS transistor PM1, the seventh PMOS transistor PM7, and the first resistor R1, is output as required to the input/output end iop, thereby ensuring that the interface circuit is in the normal working state; or when the high-level power supply end AVDDH is powered off (that is, at a low potential, which is 0 V), the input/output end iop is externally connected to a high-level signal (that is, at a high potential, which is 3.3 V), and the interface circuit is in the current backflow prevention state:
controlling the bias circuit 20 to input, by using the substrate bias voltage generation end Pbulk, the voltage (that is, the second substrate bias voltage $V_{a2}$, about 3.3 V) of the input/output end iop to the substrates of the first PMOS transistor PM1 and the seventh PMOS transistor PM7, so that the parasitic diodes in the first PMOS transistor PM1 and the seventh PMOS transistor PM7 are not conducted, thereby avoiding current leakage; controlling the input signal control circuit 10 to output an electrical signal of the bias voltage generation end bias of the bias circuit 20 to the gate of the first PMOS transistor PM1, to control the first PMOS transistor PM1 to be cut off; and controlling the over-voltage protection control circuit 30 to output the voltage (about 3.3 V) of the input/output end iop to the gate of the seventh PMOS transistor PM7, so as to control the seventh PMOS transistor PM7 to be cut off, thereby ensuring that the high potential (3.3 V) of the input/output end iop does not perform a current backflow to the high-level power supply end AVDDH and the interface circuit is in the current backflow prevention state.

In addition, with reference to FIG. 5, in Embodiment 2, when the bias circuit 20 includes the bias voltage generation sub-circuit 201 and the substrate bias voltage generation sub-circuit 202, the method for controlling the interface circuit further includes:
in a state in which the high-level power supply end AVDDH supplies power: controlling the bias voltage generation sub-circuit 201 to output an intermediate voltage (that is, the first bias voltage $V_{b1}$, about 1.65 V) between the high-level power supply end AVDDH and the ground end GND to the bias voltage generation end bias; and controlling the substrate bias voltage generation sub-circuit 202 to output the voltage (that is, the first substrate bias voltage $V_{a1}$, about 3.3 V) of the high-level power supply end AVDDH to the substrate bias voltage generation end Pbulk; or
in a state in which the high-level power supply end AVDDH is powered off and the input/output end iop is externally connected to a high-level signal: controlling the bias voltage generation sub-circuit 201 to output an intermediate voltage (that is, the second bias voltage $V_{b2}$, about 1.65 V) between the input/output end iop and the ground end GND to the bias voltage generation end bias, and controlling the substrate bias voltage generation sub-circuit 202 to output the voltage (that is, the second substrate bias voltage $V_{a2}$, about 3.3 V) of the input/output end iop to the substrate bias voltage generation end Pbulk.

In addition, with reference to FIG. 4 and FIG. 2, in a case in which the interface circuit provided in Embodiment 1 and Embodiment 2 includes the input buffer circuit 100, the method for controlling the interface circuit further includes:
controlling the input buffer circuit 100 to adjust a voltage input by the signal input end input to a voltage amplitude between the high-level power supply end AVDDH and the low-level power supply end (AVDDL or GND), and then outputting the adjusted voltage to the first input end in1 of the input signal control circuit 10, so that the amplitude-adjusted voltage is output to the gate of the first PMOS transistor PM1 by using the input signal control circuit 10.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An interface circuit, comprising:
    a first positive-channel metal oxide semiconductor (PMOS) transistor;
    an input signal control circuit, comprising a first input end, a second input end, and an output end;
    a bias circuit, comprising a first end, a second end, a third end, a substrate bias voltage generation end, and a bias voltage generation end;
    a signal input end; and
    an input/output end;
    wherein the first input end of the input signal control circuit is connected to the signal input end, the second input end of the input signal control circuit is connected to the bias voltage generation end, and the output end of the input signal control circuit is connected to a gate of the first PMOS transistor;
    wherein a first electrode of the first PMOS transistor is connected to a high-level power supply end, and a second electrode of the first PMOS transistor is connected to the input/output end;
    wherein the substrate bias voltage generation end is connected to a substrate of the first PMOS transistor, the first end of the bias circuit is coupled to the high-level power supply end, the second end of the bias circuit is coupled to the input/output end, and the third end of the bias circuit is coupled to a ground end;
    wherein the input signal control circuit is configured to transmit an electrical signal of the signal input end or an electrical signal of the bias voltage generation end bias to the gate of the first PMOS transistor; and
    wherein the bias circuit is configured to perform connection and conduction between the high-level power supply end and the substrate bias voltage generation end, or perform connection and conduction between the input/output end and the substrate bias voltage generation end.

2. The interface circuit according to claim 1, wherein the input signal control circuit and the bias circuit are configured to:
    when the high-level power supply end is powered on, transmit, by the input signal control circuit, an electrical signal of the signal input end to the gate of the first PMOS transistor, and transmit, by the bias circuit, a voltage of the high-level power supply end to the substrate bias voltage generation end; or
    when the high-level power supply end is powered off, and the input/output end is externally connected to a high-level signal, transmit, by the input signal control circuit, an electrical signal of the bias voltage generation end to the gate of the first PMOS transistor, and transmit, by the bias circuit, a voltage of the input/output end to the substrate bias voltage generation end of the bias circuit.

3. The interface circuit according to claim 1, wherein the interface circuit is integrated into a chip, and the input/output end is connected to a pin of the chip.

4. The interface circuit according to claim 1, further comprising a first resistor connected in series between the second electrode of the first PMOS transistor and the input/output end.

5. The interface circuit according to claim 1, further comprising an input buffer circuit;
    wherein an input end of the input buffer circuit is connected to the signal input end, an output end of the input buffer circuit is connected to the first input end of the input signal control circuit, and the input buffer circuit is connected to the high-level power supply end and a low-level power supply end; and
    wherein the input buffer circuit is configured to adjust a voltage amplitude of the signal input end to a voltage amplitude between the high-level power supply end and the low-level power supply end, to obtain an adjusted voltage amplitude, and output the adjusted voltage amplitude to the first input end of the input signal control circuit.

6. The interface circuit according to claim 1, wherein:
    the input signal control circuit comprises a first negative-channel metal oxide semiconductor (NMOS) transistor, a second PMOS transistor, and a third PMOS transistor;
    a gate of the first NMOS transistor is connected to the high-level power supply end, a first electrode of the first NMOS transistor is connected to the output end of the input signal control circuit, and a second electrode of the first NMOS transistor is connected to the first input end of the input signal control circuit;
    a gate of the second PMOS transistor is connected to the bias voltage generation end, a first electrode of the second PMOS transistor is connected to the first input end or the second input end of the input signal control circuit, and a second electrode of the second PMOS transistor is connected to the output end of the input signal control circuit; and
    a gate of the third PMOS transistor is connected to the high-level power supply end, a first electrode of the third PMOS transistor is connected to the second input end of the input signal control circuit, and a second electrode of the third PMOS transistor is connected to the output end of the input signal control circuit.

7. The interface circuit according to claim 2, wherein:
    the bias circuit comprises a second resistor, a third resistor, a fourth PMOS transistor, a fifth PMOS transistor, a sixth PMOS transistor, and a second NMOS transistor;
    a first end of the second resistor is connected to the high-level power supply end, and a second end of the second resistor is connected to a first node;
    a first end of the third resistor is connected to the input/output end, and a second end of the third resistor is connected to a first electrode of the fifth PMOS transistor;
    a gate of the fourth PMOS transistor is connected to a second node, a first electrode of the fourth PMOS transistor is connected to the first node, and a second electrode of the fourth PMOS transistor is connected to the substrate bias voltage generation end;
    a gate of the fifth PMOS transistor is connected to the first node, and a second electrode of the fifth PMOS transistor is connected to the second node;
    a gate of the sixth PMOS transistor is connected to the first node, a first electrode of the sixth PMOS transistor is connected to the second node, and a second electrode of the sixth PMOS transistor is connected to the substrate bias voltage generation end; and a gate of the second NMOS transistor is connected to the first node, a first electrode of the second NMOS transistor is connected to the ground end, and a second electrode of the second NMOS transistor is connected to the second node.

8. The interface circuit according to claim 2, further comprising:
a seventh PMOS transistor; and
an over-voltage protection control circuit, comprising an over-voltage protection output end connected to the high-level power supply end, the bias voltage generation end, and the input/output end;
wherein a gate of the seventh PMOS transistor is connected to the over-voltage protection output end, a first electrode of the seventh PMOS transistor is connected to the second electrode of the first PMOS transistor, a second electrode of the seventh PMOS transistor is connected to the input/output end, and a substrate of the seventh PMOS transistor is connected to the substrate bias voltage generation end; and
wherein the over-voltage protection control circuit is configured to:
when the high-level power supply end is powered on, output a voltage of the bias voltage generation end to the gate of the seventh PMOS transistor; or
when the high-level power supply end is powered off and the input/output end is externally connected to a high-level signal, output a voltage of the input/output end to the gate of the seventh PMOS transistor.

9. The interface circuit according to claim 8, wherein:
the bias circuit comprises a bias voltage generation sub-circuit and a substrate bias voltage generation sub-circuit;
the bias voltage generation sub-circuit is connected to the bias voltage generation end, the high-level power supply end, the input/output end, and the ground end;
the substrate bias voltage generation sub-circuit is connected to the substrate bias voltage generation end, the high-level power supply end, the input/output end, and the bias voltage generation end of the bias circuit; and
wherein the bias circuit is configured to:
when the high-level power supply end is powered on, output an intermediate voltage between the high-level power supply end and the ground end to the bias voltage generation end using the bias voltage generation sub-circuit, and output the voltage of the high-level power supply end to the substrate bias voltage generation end using the substrate bias voltage generation sub-circuit; or
when the high-level power supply end is powered off, and the input/output end is externally connected to a high-level signal, output an intermediate voltage between the input/output end and the ground end to the bias voltage generation end by using the bias voltage generation sub-circuit, and output the voltage of the input/output end to the substrate bias voltage generation end by using the substrate bias voltage generation sub-circuit.

10. The interface circuit according to claim 9, wherein:
the bias voltage generation sub-circuit comprises a fourth resistor, a fifth resistor, a sixth resistor, a seventh resistor, an eighth PMOS transistor, a ninth PMOS transistor, a tenth PMOS transistor, and a third NMOS transistor;
the fourth resistor and the fifth resistor are connected in series between the high-level power supply end and the ground end, and a connection node between the fourth resistor and the fifth resistor is connected to a third node;
the sixth resistor and the seventh resistor are connected in series between the input/output end and the ground end, the connection node between the fourth resistor and the fifth resistor is connected to the third node, and a connection node between the sixth resistor and the seventh resistor is connected to a first electrode of the eighth PMOS transistor;
a gate of the eighth PMOS transistor is connected to the third node, and a second electrode of the eighth PMOS transistor is connected to a fourth node;
a gate of the ninth PMOS transistor is connected to the fourth node, a first electrode of the ninth PMOS transistor is connected to the third node, and a second electrode of the ninth PMOS transistor is connected to the bias voltage generation end;
a gate of the tenth PMOS transistor is connected to the third node, a first electrode of the tenth PMOS transistor is connected to the fourth node, and a second electrode of the tenth PMOS transistor is connected to the bias voltage generation end; and
a gate of the third NMOS transistor is connected to the third node, a first electrode of the third NMOS transistor is connected to the ground end, and a second electrode of the third NMOS transistor is connected to the fourth node.

11. The interface circuit according to claim 10, wherein:
the substrate bias voltage generation sub-circuit comprises an eleventh PMOS transistor, a twelfth PMOS transistor, a thirteenth PMOS transistor, a fourteenth PMOS transistor, a fifteenth PMOS transistor, and a sixteenth PMOS transistor;
a gate of the eleventh PMOS transistor is connected to the bias voltage generation end, a first electrode of the eleventh PMOS transistor is connected to the high-level power supply end, a second electrode of the eleventh PMOS transistor is connected to a first electrode of the twelfth PMOS transistor, a gate of the twelfth PMOS transistor is connected to the over-voltage protection output end, and a second electrode of the twelfth PMOS transistor is connected to the substrate bias voltage generation end;
a gate of the thirteenth PMOS transistor is connected to the bias voltage generation end, a first electrode of the thirteenth PMOS transistor is connected to the input/output end, a second electrode of the thirteenth PMOS transistor is connected to a first electrode of the fourteenth PMOS transistor, and a second electrode of the fourteenth PMOS transistor is connected to the substrate bias voltage generation end;
a gate of the fifteenth PMOS transistor is connected to the bias voltage generation end, a first electrode of the fifteenth PMOS transistor is connected to the high-level power supply end, and a second electrode of the fifteenth PMOS transistor is connected to a gate of the fourteenth PMOS transistor; and
a gate of the sixteenth PMOS transistor is connected to the high-level power supply end, a first electrode of the sixteenth PMOS transistor is connected to the bias voltage generation end, and a second electrode of the sixteenth PMOS transistor is connected to the gate of the fourteenth PMOS transistor.

12. The interface circuit according to claim 11, wherein:
the over-voltage protection control circuit comprises a fourth NMOS transistor, a fifth NMOS transistor, a seventeenth PMOS transistor, an eighteenth PMOS transistor, a nineteenth PMOS transistor, and a twentieth PMOS transistor;

a gate of the fourth NMOS transistor is connected to the high-level power supply end, a first electrode of the fourth NMOS transistor is connected to a second electrode of the fifth NMOS transistor, and a second electrode of the fourth NMOS transistor is connected to the bias voltage generation end;

a first electrode of the fifth NMOS transistor is connected to the over-voltage protection output end, and a gate of the fifth NMOS transistor is connected to a fifth node;

a gate of the seventeenth PMOS transistor is connected to the bias voltage generation end, a first electrode of the seventeenth PMOS transistor is connected to the high-level power supply end, and a second electrode of the seventeenth PMOS transistor is connected to the fifth node;

a gate of the eighteenth PMOS transistor is connected to the high-level power supply end, a first electrode of the eighteenth PMOS transistor is connected to the bias voltage generation end, and a second electrode of the eighteenth PMOS transistor is connected to the fifth node;

a gate of the nineteenth PMOS transistor is connected to the bias voltage generation end, a first electrode of the nineteenth PMOS transistor is connected to the input/output end, and a second electrode of the nineteenth PMOS transistor is connected to a first electrode of the twentieth PMOS transistor; and a gate of the twentieth PMOS transistor is connected to the fifth node, and a second electrode of the twentieth PMOS transistor is connected to the over-voltage protection output end.

13. A chip, comprising:
a pin; and
an interface circuit, comprising:
   a first positive-channel metal oxide semiconductor (PMOS) transistor;
   an input signal control circuit, comprising a first input end, a second input end, and an output end;
   a bias circuit, comprising a first end, a second end, a third end, a substrate bias voltage generation end, and a bias voltage generation end;
   a signal input end; and
   an input/output end;
wherein the first input end of the input signal control circuit is connected to the signal input end, the second input end of the input signal control circuit is connected to the bias voltage generation end, and the output end of the input signal control circuit is connected to a gate of the first PMOS transistor;
wherein a first electrode of the first PMOS transistor is connected to a high-level power supply end, and a second electrode of the first PMOS transistor is connected to the input/output end;
wherein the substrate bias voltage generation end of the bias circuit is connected to a substrate of the first PMOS transistor, the first end of the bias circuit is coupled to the high-level power supply end, the second end of the bias circuit is coupled to the input/output end, and the third end of the bias circuit is coupled to a ground end;
wherein the input signal control circuit is configured to transmit an electrical signal of the signal input end or an electrical signal of the bias voltage generation end to the gate of the first PMOS transistor; and wherein the bias circuit is configured to perform connection and conduction between the high-level power supply end and the substrate bias voltage generation end, or perform connection and conduction between the input/output end and the substrate bias voltage generation end; and wherein the input/output end of the interface circuit is connected to the pin.

14. A terminal device, comprising the chip according to claim 13 and an interface, wherein the chip is connected to the interface.

15. The chip according to claim 13, wherein the input signal control circuit and the bias circuit are configured to:
   when the high-level power supply end is powered on, transmit, by the input signal control circuit, an electrical signal of the signal input end to the gate of the first PMOS transistor, and transmit, by the bias circuit, a voltage of the high-level power supply end to the substrate bias voltage generation end; or
   when the high-level power supply end is powered off, and the input/output end is externally connected to a high-level signal, transmit, by the input signal control circuit, an electrical signal of the bias voltage generation end to the gate of the first PMOS transistor, and transmit, by the bias circuit, a voltage of the input/output end to the substrate bias voltage generation end.

16. The chip according to claim 13, wherein the interface circuit is integrated into the chip.

17. The chip according to claim 13, wherein the interface circuit further comprises a first resistor connected in series between the second electrode of the first PMOS transistor and the input/output end.

18. The chip according to claim 13, wherein the interface circuit further comprises an input buffer circuit;
wherein an input of the input buffer circuit is connected to the signal input end, an output of the input buffer circuit is connected to the first input end of the input signal control circuit, and the input buffer circuit is connected to the high-level power supply end and a low-level power supply end; and
wherein the input buffer circuit is configured to adjust a voltage amplitude of the signal input end to a voltage amplitude between the high-level power supply end and the low-level power supply end, to obtain an adjusted voltage amplitude, and output the adjusted voltage amplitude to the first input end of the input signal control circuit.

19. The chip according to claim 13, wherein:
the input signal control circuit comprises a first negative-channel metal oxide semiconductor (NMOS) transistor, a second PMOS transistor, and a third PMOS transistor;
a gate of the first NMOS transistor is connected to the high-level power supply end, a first electrode of the first NMOS transistor is connected to the output end of the input signal control circuit, and a second electrode of the first NMOS transistor is connected to the first input end of the input signal control circuit;
a gate of the second PMOS transistor is connected to the bias voltage generation end of the bias circuit, a first electrode of the second PMOS transistor is connected to the first input end or the second input end of the input signal control circuit, and a second electrode of the second PMOS transistor is connected to the output end of the input signal control circuit; and
a gate of the third PMOS transistor is connected to the high-level power supply end, a first electrode of the third PMOS transistor is connected to the second input end of the input signal control circuit, and a second electrode of the third PMOS transistor is connected to the output end of the input signal control circuit.

\* \* \* \* \*

UNITED STATES PATENT AND TRADEMARK OFFICE
CERTIFICATE OF CORRECTION

PATENT NO. : 12,494,780 B2  
APPLICATION NO. : 18/468475  
DATED : December 9, 2025  
INVENTOR(S) : Qian et al.

Page 1 of 1

It is certified that error appears in the above-identified patent and that said Letters Patent is hereby corrected as shown below:

In the Claims

In Column 31, in Claim 1, Line 41, delete "bias to the" and insert -- to the --.

Signed and Sealed this  
Twentieth Day of January, 2026

John A. Squires  
*Director of the United States Patent and Trademark Office*